(12) United States Patent
Cannistraro et al.

(10) Patent No.: US 7,805,685 B2
(45) Date of Patent: Sep. 28, 2010

(54) METHOD AND APPARATUS FOR DISPLAYING A GAIN CONTROL INTERFACE WITH NON-LINEAR GAIN LEVELS

(75) Inventors: Alan C. Cannistraro, San Francisco, CA (US); Kelly B. Jacklin, Cupertino, CA (US); Roger A. Powell, Burlingame, CA (US)

(73) Assignee: Apple, Inc., Cupertino, CA (US)

( * ) Notice: Subject to any disclaimer, the term of this patent is extended or adjusted under 35 U.S.C. 154(b) by 492 days.

(21) Appl. No.: 11/872,346

(22) Filed: Oct. 15, 2007

(65) Prior Publication Data

US 2008/0088720 A1 Apr. 17, 2008

Related U.S. Application Data

(63) Continuation of application No. 10/409,706, filed on Apr. 5, 2003, now Pat. No. 7,328,412.

(51) Int. Cl.
*G06F 3/048* (2006.01)
*G06F 3/00* (2006.01)

(52) U.S. Cl. ................. 715/833; 345/156; 345/157; 715/700; 715/716; 715/726; 715/727; 715/724

(58) Field of Classification Search ........... 715/700, 715/716, 723–727, 833
See application file for complete search history.

(56) References Cited

U.S. PATENT DOCUMENTS

| | | | |
|---|---|---|---|
| 4,283,984 A | | 8/1981 | Faulkner |
| 4,375,671 A | | 3/1983 | Engle |
| 4,684,983 A | * | 8/1987 | Acampora et al. ..... 375/240.12 |
| 4,873,676 A | * | 10/1989 | Bailey et al. ................... 367/98 |
| 4,939,782 A | | 7/1990 | Gambacurta et al. |
| 5,179,528 A | | 1/1993 | Robertson et al. |
| 5,204,969 A | * | 4/1993 | Capps et al. ................. 704/278 |
| 5,239,458 A | * | 8/1993 | Suzuki ......................... 700/83 |
| 5,239,467 A | * | 8/1993 | Kelly et al. ................... 702/16 |
| 5,280,275 A | * | 1/1994 | Kaplan ....................... 345/157 |
| 5,371,846 A | | 12/1994 | Bates |
| 5,428,730 A | | 6/1995 | Baker et al. |

(Continued)

OTHER PUBLICATIONS

Avid Technology Inc. et al. "Avid Express DV User's Guide" 2002.*

(Continued)

*Primary Examiner*—Steven B Theriault
(74) *Attorney, Agent, or Firm*—Adeli & Tollen, LLP

(57) ABSTRACT

A method for displaying a gain control interface having a gain level display with non-linear gain levels. The gain level display has a first end having an associated first pixel offset value and a second end having an associated second pixel offset value. A range of pixel offset values span from the first pixel offset value through the second pixel offset value. The method includes receiving a plurality of pixel offset values in the range of pixel offset values, calculating a gain level value for each of the plurality of pixel offset values (whereby a difference between two pixel offset values of two gain level values having a gain level difference is not equal to a difference of two pixel offset values of any other two gain level values having the same gain level difference), and mapping a gain level value to a pixel offset value.

25 Claims, 19 Drawing Sheets

U.S. PATENT DOCUMENTS

| | | | |
|---|---|---|---|
| 5,542,039 A * | 7/1996 | Brinson et al. | 715/800 |
| 5,551,160 A * | 9/1996 | Ferris et al. | 33/452 |
| 5,559,301 A * | 9/1996 | Bryan et al. | 84/653 |
| 5,577,190 A | 11/1996 | Peters | |
| 5,615,347 A * | 3/1997 | Davis et al. | 715/833 |
| 5,657,221 A | 8/1997 | Warman et al. | |
| 5,710,899 A * | 1/1998 | Eick | 715/764 |
| 5,751,285 A * | 5/1998 | Kashiwagi et al. | 715/833 |
| 5,764,179 A | 6/1998 | Tsurumoto | |
| 5,805,145 A | 9/1998 | Jaeger | |
| 5,805,146 A | 9/1998 | Jaeger et al. | |
| 5,812,688 A | 9/1998 | Gibson | |
| 5,850,531 A * | 12/1998 | Cox et al. | 715/781 |
| 5,933,505 A | 8/1999 | Bargauan | |
| 5,966,125 A | 10/1999 | Johnson | |
| 6,031,529 A | 2/2000 | Migos et al. | |
| 6,061,062 A * | 5/2000 | Venolia | 715/856 |
| 6,154,600 A | 11/2000 | Newman et al. | |
| 6,157,381 A | 12/2000 | Bates et al. | |
| 6,320,577 B1 * | 11/2001 | Alexander | 345/440.1 |
| 6,359,632 B1 | 3/2002 | Eastty et al. | |
| 6,452,612 B1 | 9/2002 | Holtz et al. | |
| 6,486,896 B1 * | 11/2002 | Ubillos | 715/784 |
| 6,490,359 B1 | 12/2002 | Gibson | |
| 6,502,045 B1 * | 12/2002 | Biagiotti | 702/66 |
| 6,507,658 B1 | 1/2003 | Abel et al. | |
| 6,532,024 B1 | 3/2003 | Everett et al. | |
| 6,636,197 B1 * | 10/2003 | Goldenberg et al. | 345/156 |
| 6,661,900 B1 | 12/2003 | Allred et al. | |
| 6,678,105 B2 | 1/2004 | Melas | |
| 6,704,012 B1 | 3/2004 | Lefave | |
| 6,829,017 B2 | 12/2004 | Phillips | |
| 6,870,936 B1 | 3/2005 | Ajamian | |
| 6,897,880 B2 * | 5/2005 | Samra | 345/619 |
| 6,922,816 B1 * | 7/2005 | Amin et al. | 715/833 |
| 6,993,546 B2 * | 1/2006 | Nally et al. | 708/313 |
| 7,058,126 B1 | 6/2006 | Allred | |
| 7,080,321 B2 | 7/2006 | Aleksander et al. | |
| 7,080,324 B1 * | 7/2006 | Nelson et al. | 715/771 |
| 7,111,239 B2 | 9/2006 | Morris-Yates | |
| 7,222,308 B2 * | 5/2007 | Sauermann et al. | 715/833 |
| 2002/0109710 A1 | 8/2002 | Holtz et al. | |
| 2002/0141643 A1 | 10/2002 | Jaeger | |
| 2004/0030425 A1 | 2/2004 | Yeakel et al. | |
| 2004/0136548 A1 | 7/2004 | Miller | |
| 2005/0025321 A1 | 2/2005 | Ajamian | |
| 2005/0239397 A1 | 10/2005 | Kreifeldt et al. | |
| 2006/0168521 A1 | 7/2006 | Shimizu et al. | |

OTHER PUBLICATIONS

Ableton ag. et al. "Ableton Live 2.1" 2002.*
Non-Final Office Action of U.S. Appl. No. 10/409,706, Dec. 27, 2006, Cannistraro, et al., which issued as U.S. Patent 7,328,412.
Notice of Allowance of U.S. Appl. No. 10/409,706, Jul. 3, 2007, Cannistraro, et al., which issued as U.S. Patent 7,328,412.
Digitaltrends, et al. "Notice to programmers of Audio Software and hardware" Jan. 2003.
e.wikipedia.org, et al. "Decibel" Dec. 11, 2006.
www.phys.unsw.edu.au/~jw/dB.thml "What is a decibel" 2006.
www.faq.org.docs/electric/Semi/SEMI_1.html "Lessons in electric circuits—vol. III Chapter 1" 2006.

* cited by examiner

METHOD AND APPARATUS FOR DISPLAYING A GAIN CONTROL INTERFACE WITH NON-LINEAR GAIN LEVELS

CLAIM OF BENEFIT TO PRIOR APPLICATION

This application is a continuation application of U.S. patent application Ser. No. 10/409,706 filed Apr. 5, 2003, entitled "Method and Apparatus for Displaying a Gain Control Interface with Non-Linear Gain Levels", now issued as U.S. Pat. No. 7,328,412, which is incorporated herein by reference.

FIELD OF THE INVENTION

The invention is directed towards a method and apparatus for displaying a gain control interface having a gain level display with non-linear gain levels.

BACKGROUND OF THE INVENTION

Gain control interfaces that allow a user to modify a gain level of an audio signal are often used in multimedia applications. A gain control interface typically contains a control icon that slides across a scale that defines a succession of gain levels (usually measured in dB). By sliding the position of the control icon across the scale, as an audio track is playing, the user can modify the gain level of the audio track during the play.

The distance between two gain levels on the scale can be measured by a number of pixels that are displayed between the two gain levels. A pixel resolution can be defined as a number of pixels per difference in gain levels. Conventionally, the scale is divided into two or more regions where each region has a linear pixel resolution (i.e., as the difference in gain levels increases, the number of pixels between the gain levels increase linearly). For example, in one region of the scale, 50 pixels may be displayed between every 2 dB difference in gain levels. In a second region of the scale, 30 pixels may be displayed between every 2 dB difference in gain levels.

The conventional approach creates a problem, however, since the user does not perceive the gain (i.e., volume) of an audio signal on a linear scale. In other words, conventional gain control interfaces do not allow a user to adjust the gain level of the audio signal in an intuitive manner. Therefore, there is a need for a gain control interface that allows the user to intuitively adjust gain levels of an audio signal in a multimedia application.

The user's adjustments, over a specific time period, of the gain levels of an audio signal can be captured as numerous data events (i.e., a stream of data events) by a multimedia application employed by the user. Each data event has a gain level value that is specified by the user at an instance in time during the time period. A multimedia application uses the data events to provide a graphical representation of the stream of data events during the specific time period. The multimedia application typically positions the data events across a gain level axis and a time-based axis of the graphical representation. A user can then modify the gain levels of the audio signal during the specific time period by changing the position of the data events in the graphical representation of the stream of data events.

Conventionally, a multimedia application will produce a graphical representation of the stream of data events that contains numerous and unnecessary data events that consumes resources of a computer executing the multimedia application. Having numerous and unnecessary data events also makes manipulation of the data events in the graphical representation difficult and cumbersome since numerous data events must be re-positioned to modify the gain levels of the audio signal during a particular time span. For example, in the graphical representation, a conventional multimedia application may display numerous data events in a relatively straight line across a particular time span even though only two data events (the data events at the beginning and ending of the relatively straight line) are adequate. Therefore, in using the conventional multimedia application, a user that wishes to modify the gain levels of the audio signal during the particular time span must re-position each of the numerous data events that are displayed in a relatively straight line across the particular time span.

Therefore, there is a need for a method that reduces the number of data events representing the user's interaction with the gain control interface while still adequately representing the user's interaction with the gain control interface.

SUMMARY OF THE INVENTION

Some embodiments of the invention provide a method for displaying a gain control interface having a gain level display with non-linear gain levels. The gain level display has a first end having an associated first end pixel offset value and a second end having an associated second end pixel offset value. A range of pixel offset values span from the first end pixel offset value through the second end pixel offset value. The method includes receiving a pixel offset value that is in the range of pixel offset values, calculating a gain level value for the pixel offset value using a non-linear equation, and mapping the gain level value to the pixel offset value.

Other embodiments of the invention provide a method for displaying the gain control interface having a gain level display with non-linear gain levels that includes receiving a plurality of pixel offset values in the range of pixel offset values. The method further includes calculating a gain level value for each of the plurality of pixel offset values (whereby a difference between two pixel offset values of two gain level values having a gain level difference is not equal to a difference of two pixel offset values of any other two gain level values having the same gain level difference) and mapping a gain level value to a pixel offset value for each of the plurality of pixel offset values.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for displaying a gain control interface having a gain level display with non-linear gain levels. The embodiments described below relate to the gain level of an audio signal. One of ordinary skill in the art, however, will realize that the invention can relate to a variety of parameters relating to different types of signals where values of the parameter are to be displayed non-linearly.

Figure 1:
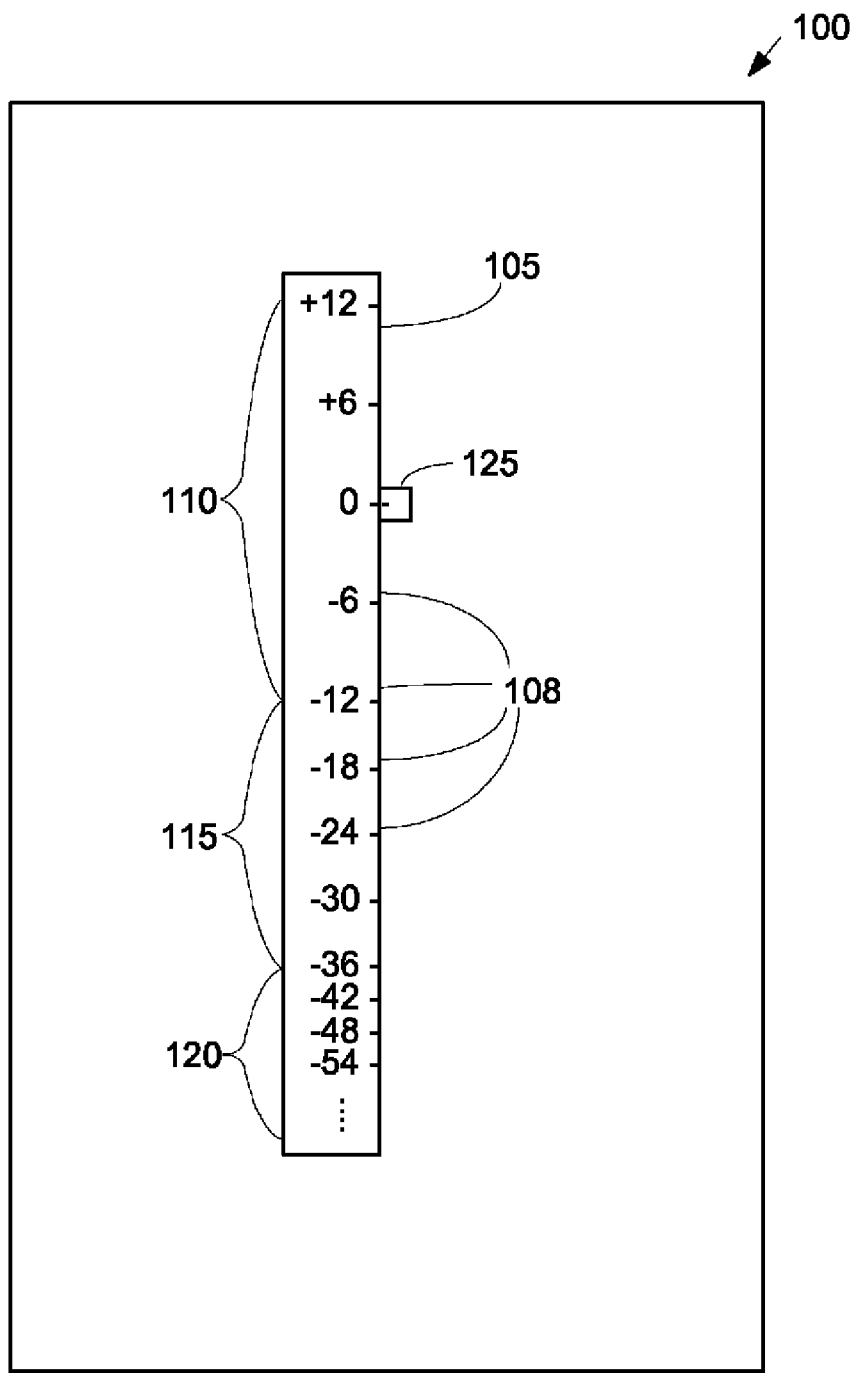
FIG. 1 shows an example of a gain control interface of the prior art.

FIG. 1 shows an example of a gain control interface 100 of the prior art. The gain control interface 100 is typically used in a multimedia application. The gain control interface 100 is part of a graphical user interface ("GUI") with which a user can interact through traditional GUI operations, such as click operations (e.g., to select an item), click-and-drag operations (e.g., to move an item), etc.

The gain control interface 100 contains a gain level display 105 and a control icon 125. The gain level display 105 is comprised of a series of pixels and displays a succession of gain level values 108 (typically in dB units) at different pixels. The succession of gain level values 108 correspond to various gain levels to be produced by the multimedia application when the control icon 125 is set adjacent to the gain level values 108 by the user. The user can adjust the position of the control icon 125 along the gain level display 105 through traditional GUI operations.

In the example shown in FIG. 1, the gain level display 105 is divided into three regions: a first region 110, a second region 115, and a third region 120. Throughout each region, there is a linear pixel resolution so that as the difference in gain levels increases, the number of pixels between the gain levels increase linearly. In the example shown in FIG. 1, the gain level values 108 are evenly spaced in terms of the number of pixels that lie between a given difference in gain level values. For example, in the first region 110, the number of pixels that lie between +12 dB and +6 dB (the gain level values having a difference of 6 dB) is the same number of pixels that lie between +6 dB and 0 dB (the gain level values having the same difference of 6 dB). As another example, in the second region 115, the number of pixels that lie between −12 dB and −18 dB (the gain level values having a difference of 6 dB) is the same number of pixels that lie between −18 dB and −24 dB (the gain level values having the same difference of 6 dB).

In the example shown in FIG. 1, a different linear equation is applied in each region to derive an even spacing of gain levels throughout the region. For example, the linear equation used for the first region 110 may produce 50 pixels for every 6 dB of gain difference and the linear equation used for the second region 115 may produce 25 pixels for every 6 dB of gain difference.

Therefore, the gain control interface 100 of the prior art is displayed using a linear relationship between the difference in gain levels and the number of pixels displayed between the gain levels. A user, however, does not perceive the gain of an audio signal on a linear scale. Therefore, the gain control interface 100 of the prior art does not allow the user to adjust the gain level of the audio signal in an intuitive manner.

Figure 2:
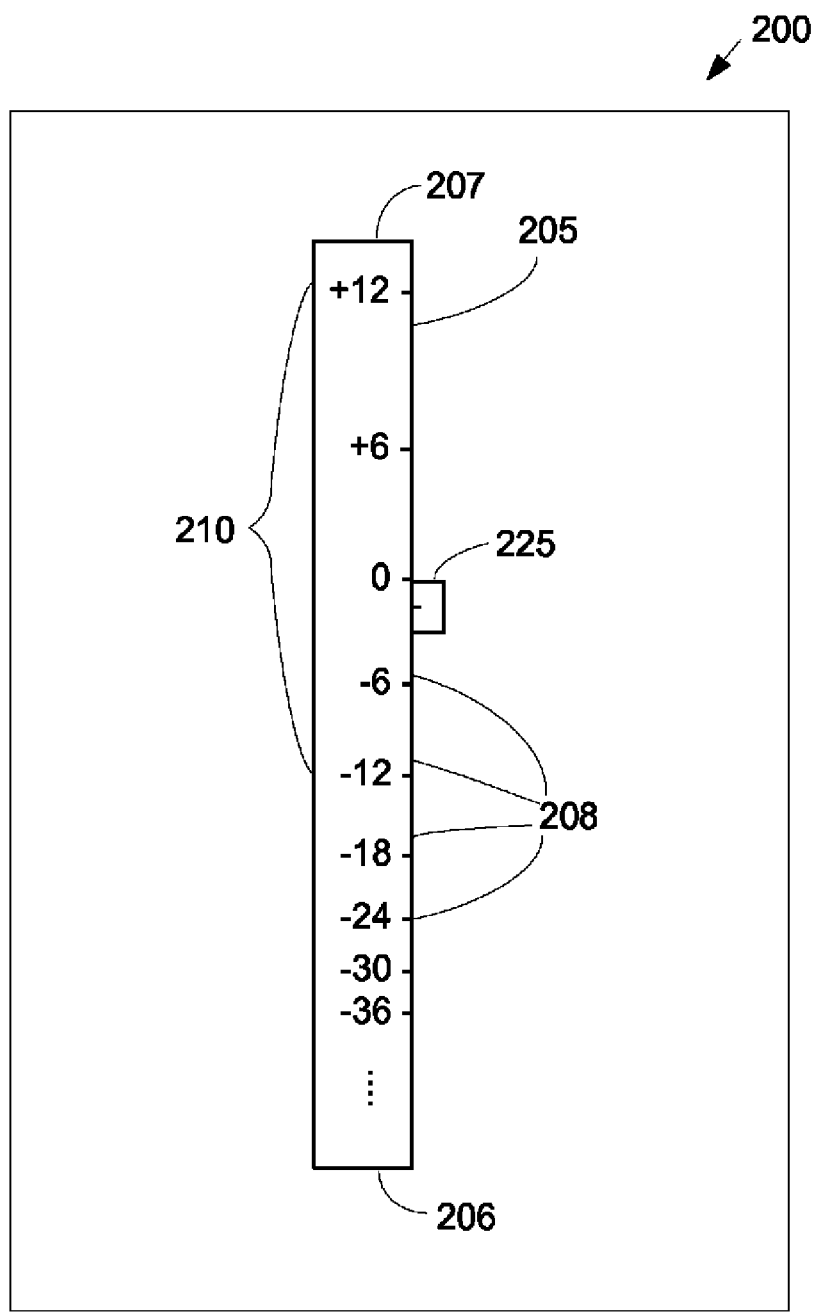
FIG. 2 shows an example of a gain control interface in accordance with the present invention.

FIG. 2 shows an example of a gain control interface 200 in accordance with the present invention. The gain control interface 200 is typically used as part of a multimedia application where a user can interact with the gain control interface 200 through a GUI. The gain control interface 200 contains a gain level display 205 and a control icon 225. The gain level display 205 is comprised of a series of pixels and displays a succession of gain level values 208 (typically in dB units) at different pixels. The succession of gain level values 208 correspond to various gain levels to be produced by the multimedia application when the control icon 225 is set adjacent to the gain level values 208 by the user.

Throughout a region of the gain level display 205, the gain level values 208 are not evenly spaced in terms of the number of pixels that lie between a given difference in gain level values 208. For example, in a first region 210, the number of pixels that lie between +12 dB and +6 dB (the gain level values having a difference of 6 dB) is not the same number of pixels that lie between +6 dB and 0 dB (the gain level values having the same difference of 6 dB). As another example, the number of pixels that lie between −12 dB and −18 dB (the gain level values having a difference of 6 dB) is not the same number of pixels that lie between −18 dB and −24 dB (the gain level values having the same difference of 6 dB).

Therefore, it can be said that the pixel resolution is not the same throughout a region of the gain level display 205 and that the pixel resolution is continuously changing along the gain level display 205. The gain level values 208 are displayed using a non-linear relationship between pixels of the gain level display 205 and the gain level value 208 displayed. In some embodiments, the non-linear relationship is a logarithmic relationship. Since gain of an audio signal is perceived by humans on a logarithmic scale, the gain control interface 200 of the present invention allows intuitive adjustment of gain levels by a user.

The gain level display 205 is comprised of a series of pixels, each pixel having an associated pixel offset value. The gain level display 205 has a first end 206 associated with a first end pixel offset value and a second end 207 associated with a second end pixel offset value. The first end pixel offset value is set to equal 0. In an alternative embodiment, the first end pixel offset value is set to equal any other number. The first end pixel offset value is lower in value than the second end pixel offset value A range of pixel offset values spans from the first end pixel offset value through the second end pixel offset value. The second end pixel offset value and the range of pixel offset values are relative to the first end pixel offset value and do not change in value when the position of the gain control interface 200 changes relative to the display in which it is displayed.

A gain level value for each pixel offset value in the range of pixel offset values is calculated using a logarithmic relationship (as discussed below in relation to FIGS. 3 and 4) whereby a difference between two pixel offset values of two gain level values having a gain level difference is not equal to a difference of two pixel offset values of any other two gain level values having the same gain level difference.

Figure 3:
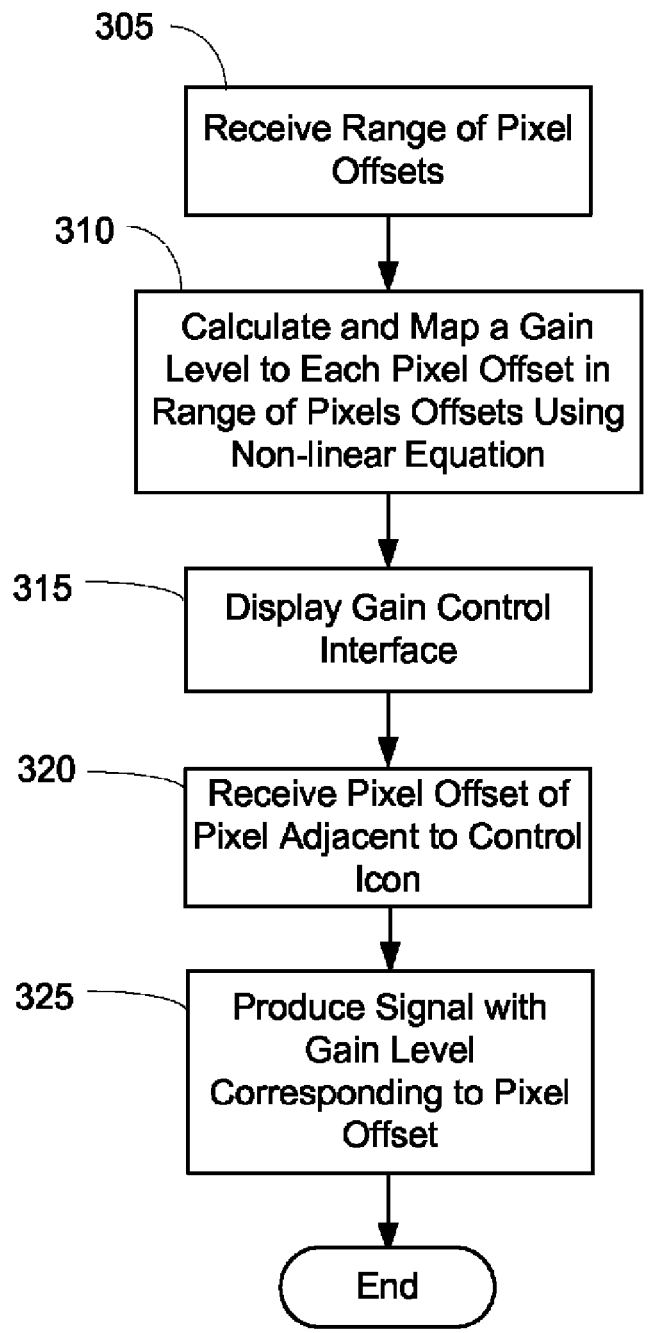
FIG. 3 illustrates a general process for displaying a gain control interface using a non-linear equation.

FIG. 3 illustrates a general process for displaying a gain control interface 200 using a non-linear equation. This process may be performed, for example, by a multimedia application.

The process begins when a range of pixel offset values of a gain level display 205 of a gain control interface 200 is received (at 305). The range of pixel offset values span from a first end pixel offset value associated with a first end 206 of the gain level display 205 through a second end pixel offset value associated with a second end 207 of the gain level display 205. The range of pixel offset values may be a contiguous range of values or may be a non-contiguous range of values. The first end pixel offset value is lower in value than the second end pixel offset value.

The process then calculates and maps (at 315) a gain level value to each pixel offset value in the range of pixels offset values using a non-linear equation (as discussed below in relation to FIG. 4). The process displays (at 315) the gain control interface 200 containing the gain level display 205 and a control icon 225. The gain level display 205 displays a succession of gain level values 208 where a gain level value mapped (at 315) to a pixel offset value is displayed at a pixel in the gain level display 205 having the pixel offset value. The succession of gain level values 208 may include any of the gain level values mapped (at 315) to a pixel offset value or any subset of the gain level values mapped (at 315) to a pixel offset value. In the example shown in FIG. 2, the succession of gain level values 208 includes +12, +6, 0, −6, −12, etc.

The process then receives (at 320) a pixel offset value of a pixel of the gain level display 205 that is adjacent to the location of the control icon 225 in the gain control interface 200. The location of where the control icon 225 is displayed relative to the gain level display 205 can be adjusted by a user through traditional GUI operations. The process produces (at 325) a signal having a gain level value that is mapped (at 315) to the received pixel offset value.

Figure 4:
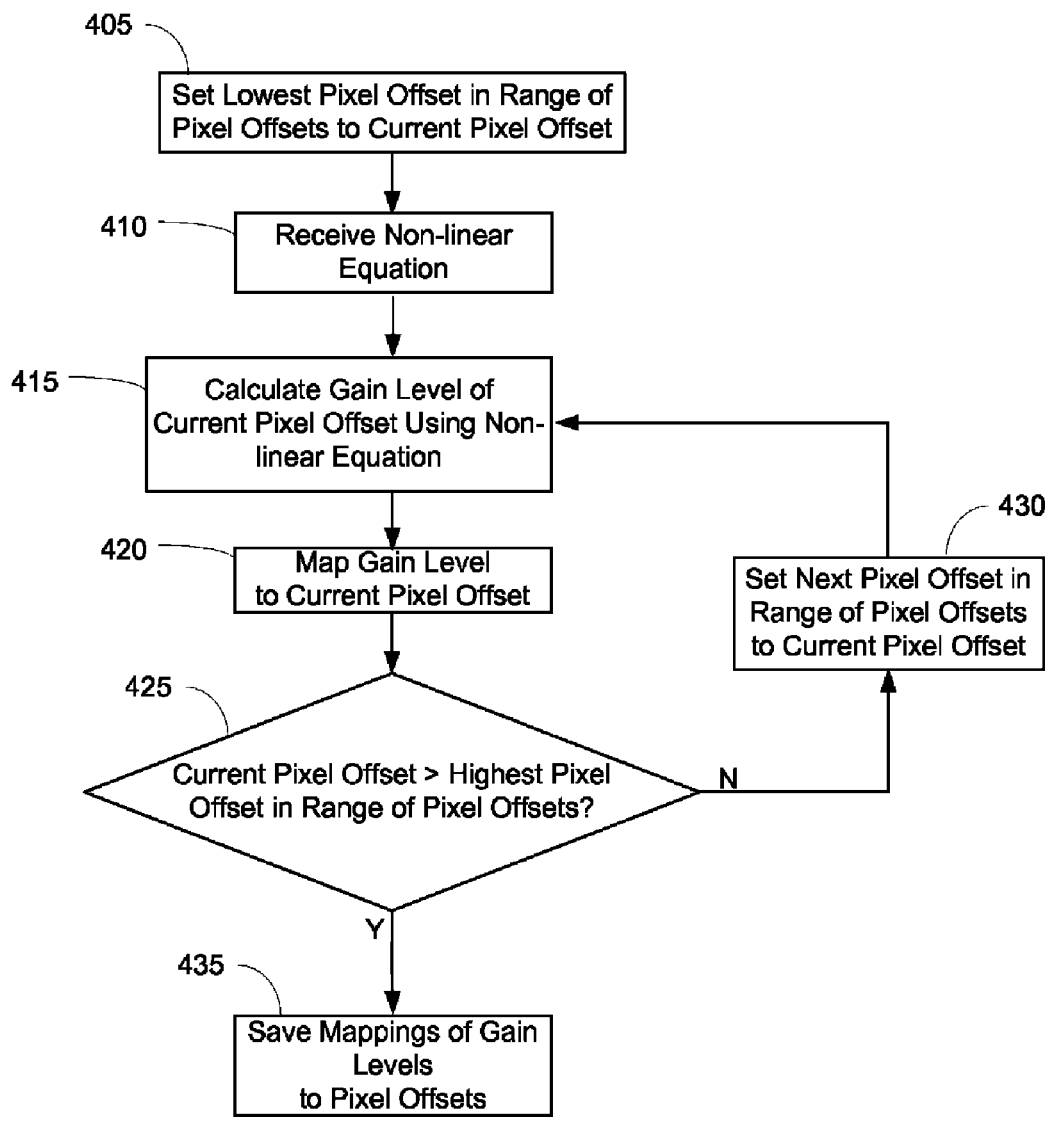
FIG. 4 illustrates a process for calculating and mapping a gain level value to each pixel in a gain level display of a gain control interface.

FIG. 4 illustrates a process for calculating and mapping a gain level value to each pixel in a gain level display 205 of a gain control interface 200. This process may be performed, for example, by a multimedia application.

The process starts when a range of pixel offset values of a gain level display 205 of a gain control interface 200 is received, the range of pixel offset values having a lowest pixel offset value and a highest pixel offset value. The process then sets (at 405) the lowest pixel offset value in the range of pixel offset values as a current pixel offset value. In an alternative, any other pixel offset value in the range of pixel offset values is set (at 405) as a current pixel offset value.

A non-linear equation is then received (at 410). In some embodiments, the non-linear equation is a logarithmic equation. In other embodiments, the non-linear equation is a logarithmic equation being defined by the following formula:

$$\text{gain level } [i] = (i/x)^\wedge (20 * k / \log_{10}(e))$$

where i=a pixel offset value, x=h/(10^(m/k)), h=height (in pixels) of the gain level display 205, m=a predetermined maximum gain level value, and k=a predetermined scaling value. The height (h) of the gain level display 205 can be determined by a difference between the highest and lowest pixel offset values of the gain level display 205. The value of m is determined by the maximum gain level value to be displayed in the gain level display 205. And the value of k is a scaling value that changes the compression or density of the pixel resolution around a gain level value of 0 dB.

The process then calculates (at 415) a gain level value of the current pixel offset value using the received non-linear equation and maps (at 420) the calculated gain level value to the current pixel offset value. The process checks (at 425) if the current pixel offset value is greater than the highest pixel offset value in the range of pixel offset values.

If the process determines (at 425—No) that the current pixel offset value is not greater than the highest pixel offset value, the process sets (at 430) the next pixel offset value in the range of pixel offset values as the current pixel offset value. The process continues and calculates (at 415) a gain level value of the current pixel offset value using the received non-linear equation. If the process determines (at 425—Yes) that the current pixel offset value is greater than the highest pixel offset value, the process saves (at 435) the mappings of the gain level values to the pixel offset values in the range of pixel offset values.

The embodiments described above provide a method for displaying a gain control interface having a gain level display with non-linear gain levels. These embodiments relate to the gain level of an audio signal. One of ordinary skill in the art, however, will realize that the invention can relate to a variety of parameters relating to different types of signals where values of the parameter are to be displayed non-linearly.

The embodiments described below provide a method for reducing data events representing a parameter of a signal adjusted by a user through a control interface during a time period. These embodiments often relate to a gain level parameter of an audio signal. One of ordinary skill in the art, however, will realize that the invention can relate to any variety of parameters relating to different types of signals. For example, the invention may relate to a panning level parameter of an audio signal. As another example, the invention may relate to a contrast or brightness level parameter of a video signal. In effect, the invention may relate to any time-based parameter of a signal.

As stated above, the user's adjustments, over a specific time period, of the gain levels of an audio signal through the gain control interface can be captured through numerous data events (i.e., a stream of data events). The stream of data events represent the gain level of the audio signal as adjusted by the user through the gain control interface during the time period. Each data event contains a gain level value and a time-based value associated with the gain level value. The time-based value reflects an instance in time when the user adjusted the audio signal to the associated gain level value during the time period.

Figure 5:
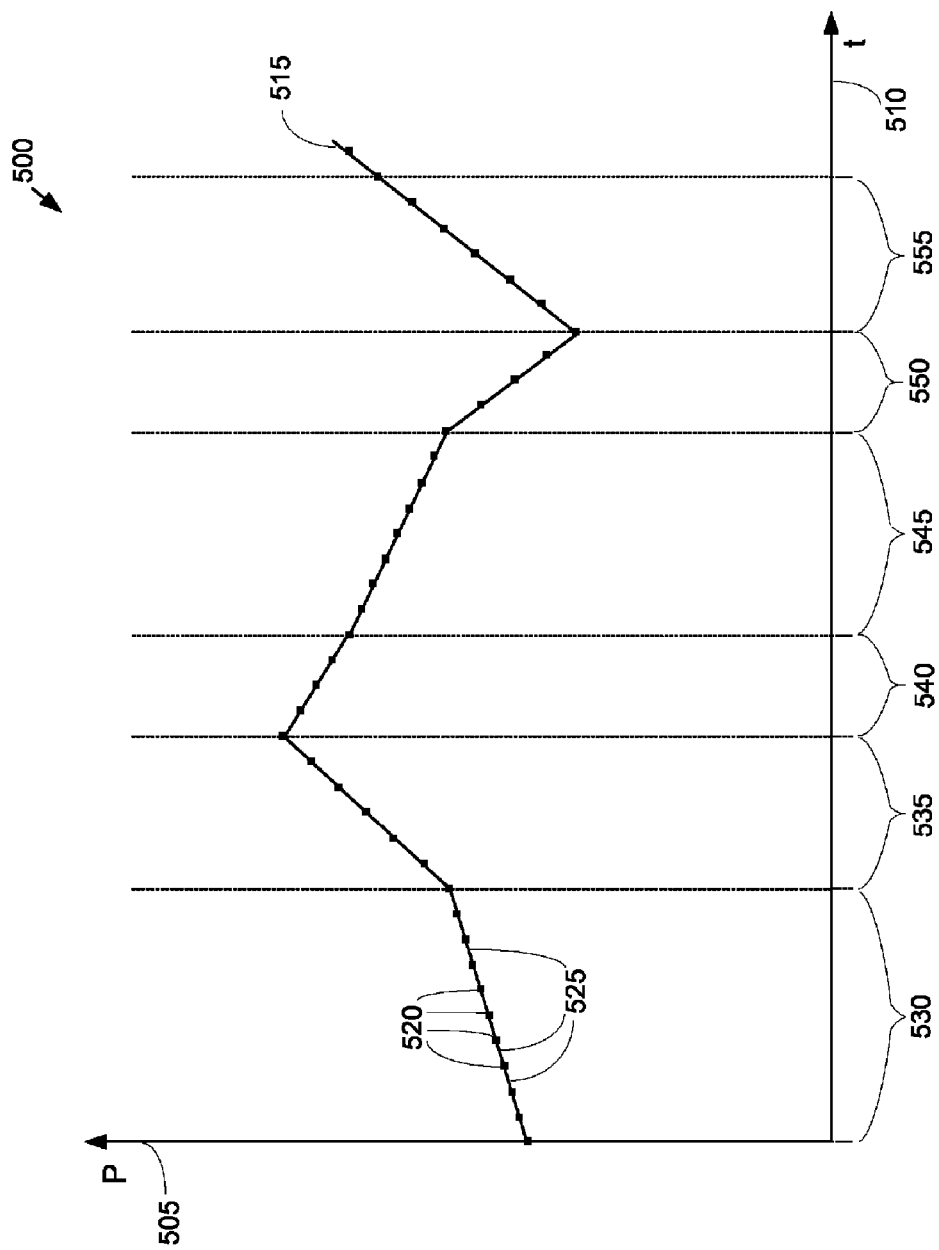
FIG. 5 illustrates an example of a graphical representation of a full representation of a stream of data events.

FIG. 5 illustrates an example of a graphical representation 500 of a full representation of a stream of data events 515 where no data events have been eliminated. The graphical representation 500 is defined along two axes, a first axis 505 representing parameter values (e.g., gain level values) of the signal and a second axis 510 representing time-based values associated with the parameter values. The full representation of the stream of data events 515 is comprised of a series of data events 520 and a series of connecting functions 525 that connect data events 520 that are adjacent relative to the second axis 510.

Each data event 520 contains a parameter value of the signal and a time-based value associated with the parameter value. The position of a data event 520 in the graphical representation 500 is based on the parameter and time-based values of the data event. Since the data events are typically generated at a uniform sampling rate, the data events are evenly spaced out along the time-based axis (the second axis 510).

The connecting functions 525 that connect the data events 520 is determined by the type of parameter values contained in the data events 520. For example, if the parameter values relate to an audio signal and the parameter values are panning level values, the connecting function 525 may be a line connecting the data events 520. As another example, if the parameter values relate to an audio signal and the parameter values are gain level values, the connecting function 525 may be a logarithmic curve connecting the data events 520.

For the purposes of discussion, the full representation of the stream of data events 515 is divided into 6 portions along the time-based axis (the second axis 510): a first portion 530, a second portion 535, a third portion 540, a fourth portion 545, a fifth portion 550, and a sixth portion 555. The first portion 530 contains data events that are generally positioned along a straight line. The second portion 535 also contains data events that are generally positioned along a straight line that is significantly different in slope than the straight line that the data events of the first portion 530 are generally positioned along.

The third portion 540 contains data events that are generally positioned along a straight line that is opposite in slope sign than the straight line that the data events of the second portion 535 are generally positioned along. The fourth portion 545 contains data events that are generally positioned along a straight line that is slightly different in slope than the straight line that the data events of the third portion 540 are generally positioned along. The fifth portion 550 contains data events that are generally positioned along a straight line that is significantly different in slope than the straight line that the data events of the fourth portion 545 are generally positioned along. And the sixth portion 555 contains data events that are generally positioned along a straight line that is opposite in slope sign than the straight line that the data events of the fifth portion 550 are generally positioned along.

As shown in FIG. 5, numerous data events 520 are used in the full representation of the stream of data events 515 even where fewer data events would adequately represent the stream of data events within a given threshold of tolerance. For example, in a first portion 530 of the full representation of the stream of data events 515, the data events 520 are positioned along a relatively straight line. Therefore, in the first portion 530, the stream of data events may be adequately represented (within a given threshold of tolerance) by only two data events—the data event at the beginning of the first portion 530 and the data event at the ending of the first portion 530. Each of the other data events in the first portion 530, therefore, can be eliminated without significantly reducing the accuracy of the representation of the stream of data events.

As a further example, the fourth portion 545 contains data events that are generally positioned along a straight line that is slightly different in slope than the straight line that the data events of the third portion 540 are generally positioned along. Therefore, across the third and fourth portions 540 and 545, the stream of data events may be adequately represented (within a given threshold of tolerance) by only two data events—the data event at the beginning of the third portion 540 and the data event at the ending of the fourth portion 545. Each of the other data events in the third and fourth portions 540 and 545, therefore, can be eliminated without significantly reducing the accuracy of the representation of the stream of data events.

Figure 6:
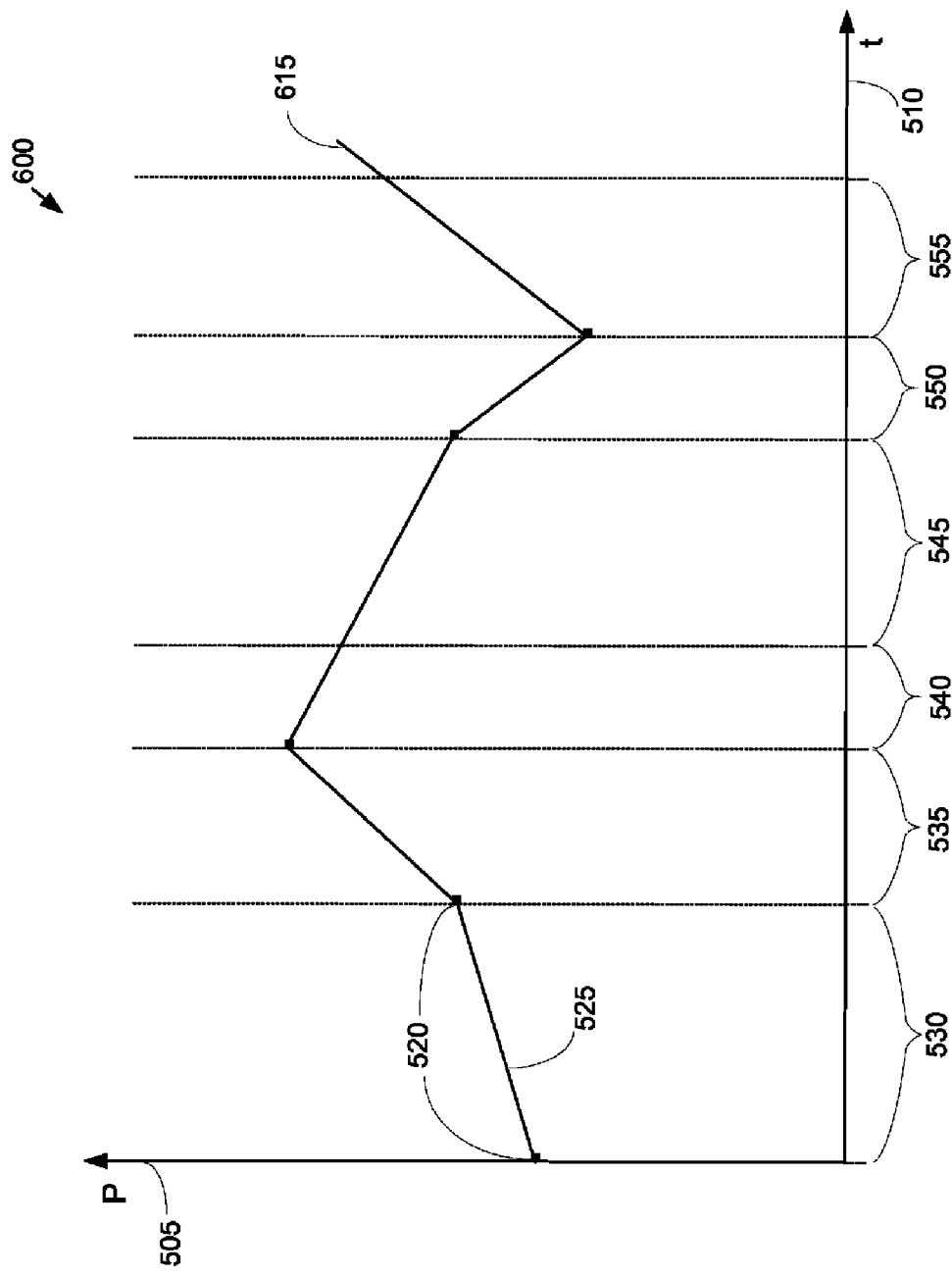
FIG. 6 illustrates an example of a graphical representation of a reduced representation of a stream of data events in accordance with the present invention.

FIG. 6 illustrates an example of a graphical representation 600 of a reduced representation of a stream of data events 615 in accordance with the present invention. The graphical representation 600 of FIG. 6 is similar to the graphical representation 500 of FIG. 5. Only those aspects that differ with the graphical representation 500 of FIG. 5 will be discussed in detail here.

The reduced representation of a stream of data events 615 relates to the same parameter of the same signal as the full representation of the stream of data events 515 of FIG. 5. The reduced representation of a stream of data events 615, however, is comprised of fewer data events than the full representation of the stream of data events 515. Data events of the full representation of the stream of data events 515 are reduced or eliminated in accordance with processes of the present invention (as described below in relation to FIGS. 13 and 14)

For the purposes of discussion, the reduced representation of a stream of data events 615 is divided into the same portions along the time-based axis (the second axis 510) as the full representation of the stream of data events 515. As shown in FIG. 6, a first portion 530 of the reduced representation of a stream of data events 615 contains only two data events 520 connected by a single connecting function 520. The rest of the data events of the first portion 530 of the full representation of a stream of data events 515 have been eliminated without significantly reducing the accuracy of the representation of the stream of data events.

Note that the data event at the ending of the first portion 530 has been retained since the first portion 530 contains data events that are generally positioned along a straight line that is significantly different in slope than the straight line that the data events of the second portion 535 are generally positioned along. Therefore, this data event is needed to accurately represent the stream of data events. Also note that the data event at the ending of the second portion 535 has been retained since the second portion 535 contains data events that are generally positioned along a straight line that is opposite in slope sign than the straight line that the data events of the third portion 540 are generally positioned along. Therefore, this data event is also needed to accurately represent the stream of data events.

A third portion 540 and a fourth portion 545 of the reduced representation of a stream of data events 615 contains only two data events 520 connected by a single connecting function 520. The straight lines with slightly different slopes of the third portion 540 and the fourth portion 545 shown in FIG. 5 have been reduced to a single line connecting the beginning data event of the third portion 540 and the ending data event of the fourth portion 545 in FIG. 6. Each of the other data events in the third and fourth portions 540 and 545 of the full representation of a stream of data events 515 have been eliminated without significantly reducing the accuracy of the representation of the stream of data events.

Note that the data event at the ending of the fourth portion 545 has been retained since the fourth portion 545 contains data events that are generally positioned along a straight line that is significantly different in slope than the straight line that the data events of the fifth portion 550 are generally positioned along. Therefore, this data event is needed to accurately represent (within a given threshold of tolerance) the stream of data events. Also note that the data event at the ending of the fifth portion 550 has been retained since the fifth portion 550 contains data events that are generally positioned along a straight line that is opposite in slope sign than the straight line that the data events of the sixth portion 555 are generally positioned along. Therefore, this data event is also needed to accurately represent the stream of data events.

In an alternative embodiment, the connecting functions 525 connecting the data events 520 is not a line but any other mathematically defined function, such as a logarithmic curve. In this description, a line is used as the connecting function only for the sake of simplicity.

Figure 7:
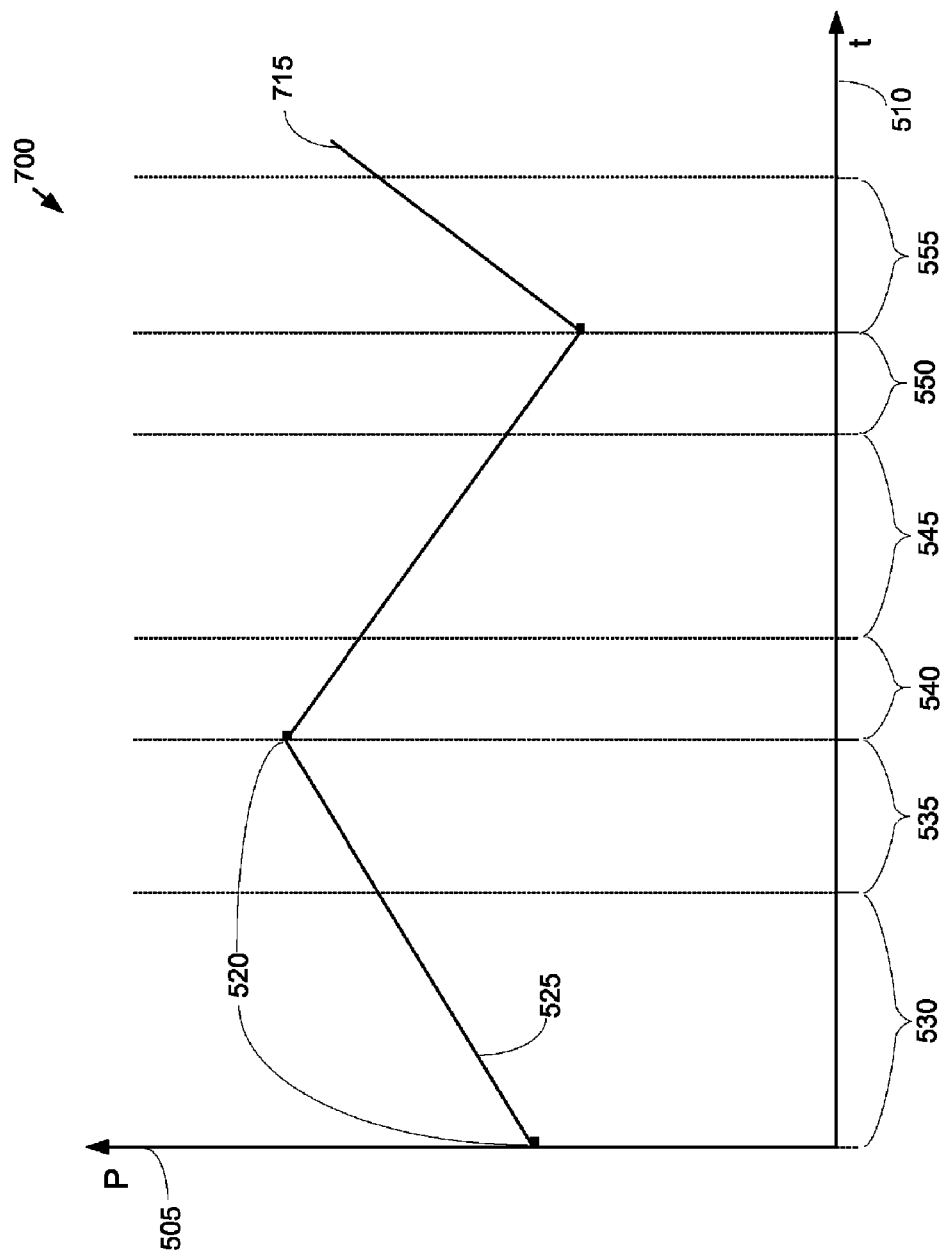
FIG. 7 illustrates an example of a graphical representation of a peaks-only representation of a stream of data events in accordance with the present invention.

FIG. 7 illustrates an example of a graphical representation 700 of a peaks-only representation of a stream of data events 715 in accordance with the present invention. The graphical representation 700 of FIG. 7 is similar to the graphical representation 500 of FIG. 5. Only those aspects that differ with the graphical representation 500 of FIG. 5 will be discussed in detail here.

The peaks-only representation of a stream of data events 715 represents the same parameter of the same signal as the full representation of the stream of data events 515 of FIG. 5. The peaks-only representation of a stream of data events 715, however, is comprised of fewer data events than the full representation of the stream of data events 515. Data events of the full representation of the stream of data events 515 are reduced or eliminated in accordance with a process of the present invention (as described below in relation to FIG. 15).

Note that only the data events 520 at "peaks" (i.e., local maxima) and "valleys" (i.e., local minima) of the full representation of a stream of data events 515 have been retained in the peaks-only representation of a stream of data events 715 and all other data events have been eliminated. A data event is at a peak "peak" or "valley" of the full representation of a stream of data events 515 when data events on one side of the data event are generally positioned along a line that is opposite in slope sign than a line that the data events on the other side of the data event are generally positioned along. As such, the data event 520 at the ending of the second portion 535 and the data event 520 at the ending of the fifth portion 550 are retained.

Figure 8:
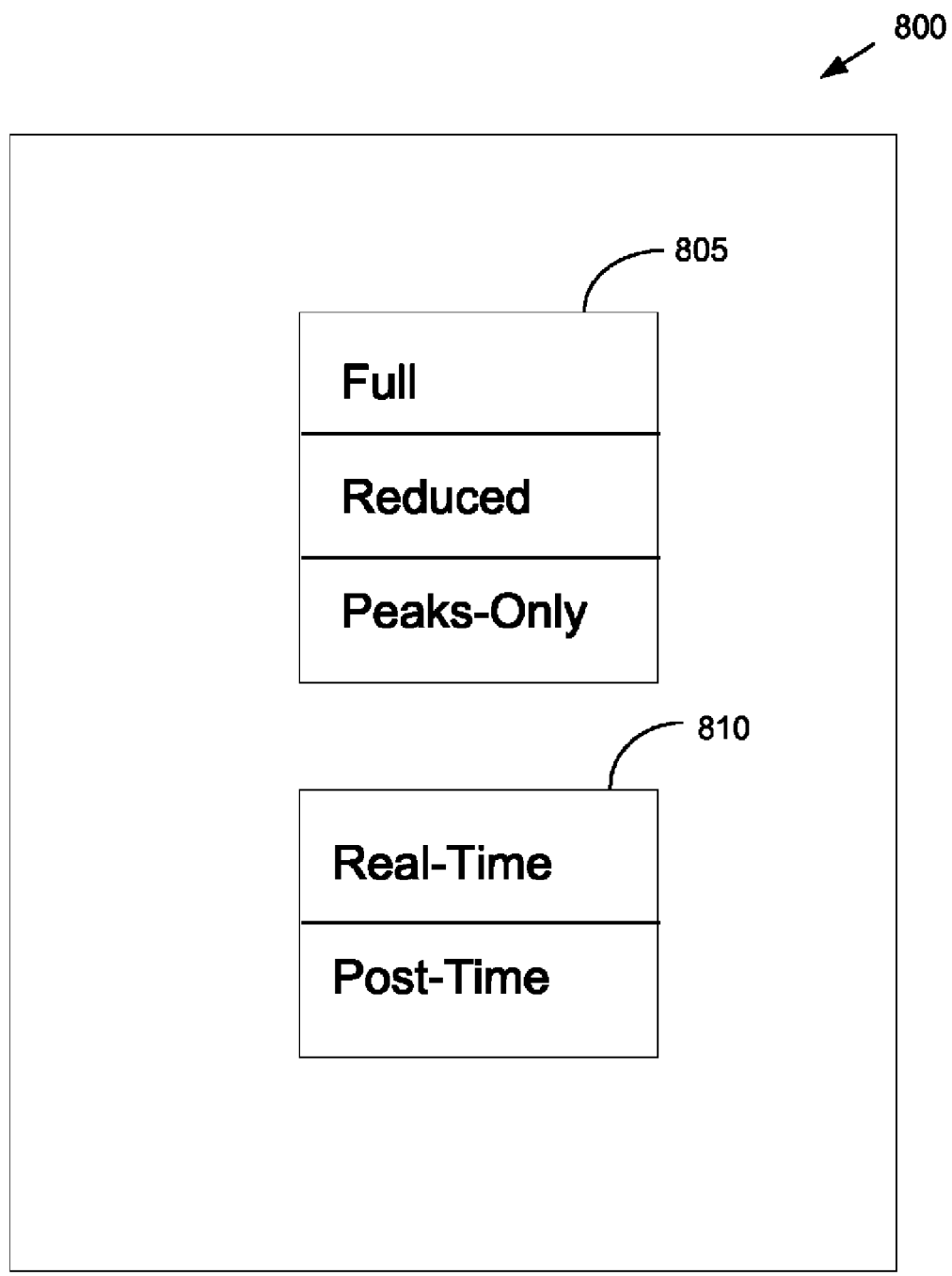
FIG. 8 illustrates an example of a mode selection interface.

FIG. 8 illustrates a mode selection interface 800 used to select a full, reduced, or peaks-only representation of a stream of data events and a real-time or post-time processing of the stream of data events. In some embodiments, the mode selection interface 800 is part of a graphical user interface ("GUI") with which a user can interact through traditional GUI operations, such as click operations (e.g., to select an item), click-and-drag operations (e.g., to move an item), etc. Different modes of the mode selection interface 800 can be selected by the user through the GUI. The mode selection interface 800 can be used as part of a multimedia application. The mode selection interface 800 includes a representation selector box 805 and a processing selector box 810. The representation selector box 805 contains options for full, reduced, or peaks-only representation of a stream of data events. The processes needed to implement the different options can be performed, for example, by a multimedia application. The processes for full representation of a stream of data events comprises capture of data events at a given sampling rate. These processes are well known in the art and are not described in detail here. The processes for reduced representation of a stream of data events comprises processes that reduce the number of data events used to represent a stream of data events (as discussed below in relation to FIGS. 13 and 14). The process for peaks-only representation of a stream of data events comprises a process that retains only those data events that represent the "peaks" and "valleys" of a stream of data events (as discussed below in relation to FIG. 15).

The processing selector box 810 contains options for real-time or post-time processing of data events of a stream of data events. The processes needed to implement these different options can be performed, for example, by a multimedia application. The option for real-time processing allows for processing of data events immediately after generation of the data events, typically before the data events have been saved to storage. In contrast, the option for post-time processing allows for processing of data events that have already been captured and saved to storage.

Figure 9:
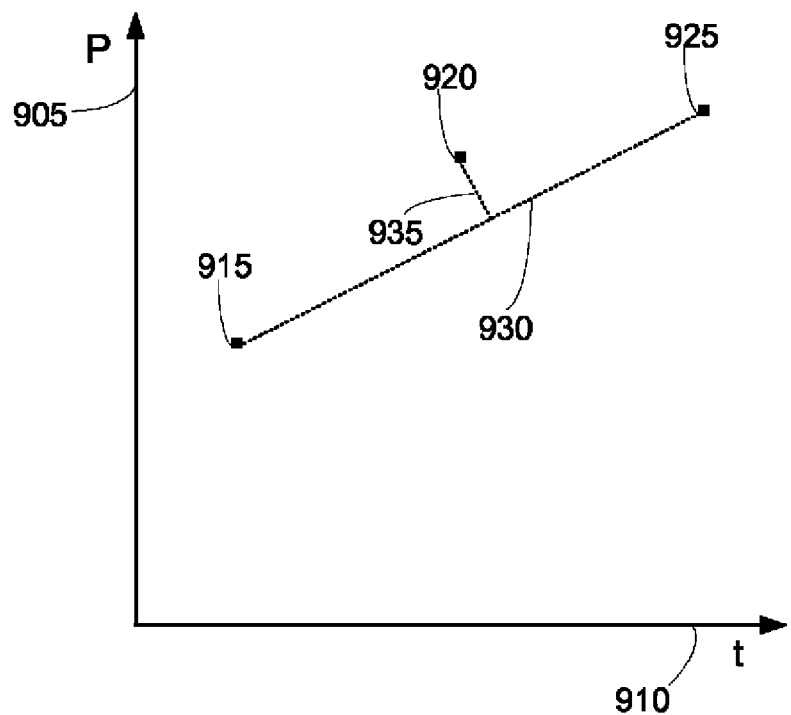
FIG. 9 shows a graphical illustration of an operation of a first algorithm used to reduce data events of a stream of data events.

FIG. 9 shows a graphical illustration of an operation of a first algorithm used to reduce data events of a stream of data events. The graphical illustration is shown along two axes, a first axis 905 representing the parameter values (e.g., gain level values) of a signal and a second axis 910 representing the time-based values associated with the parameter values. A beginning data event 915, a middle data event 920, and an ending data event 925 each contain a parameter value of the signal and a time-based value associated with the parameter value. The data events 915, 920, and 925 are defined by a time-based value of each data event relative to each the other: the beginning data event 915 has a time-based value lower than the time-based value of the middle data event 920 and the middle data event 920 has a time-based value lower than the time-based value of the ending data event 925. The time-based values of the three data events may or may not be evenly spaced.

A mathematically defined connecting function 930 connects the beginning data event 915 and the ending data event 925. The mathematically defined connecting function 930 is determined by the type of parameter values contained in the data events 915, 920, and 925. For example, if the data events 915, 920, and 925 contain panning level values for an audio signal, the mathematically defined connecting function 930 may be a line connecting the beginning data event 915 and the ending data event 925. As another example, if the data events 915, 920, and 925 contain gain level values for an audio signal, the mathematically defined connecting function 930 may be a logarithmic curve connecting the beginning data event 915 and the ending data event 925. The mathematically defined connecting function 930 is defined in terms of parameter values and time-based values.

A difference function 935 connects the middle data event 920 with the mathematically defined connecting function 930. The difference function 935 has a length that is equivalent to a difference or distance between the middle data event 920 and the mathematically defined connecting function 930. The difference function 935 and the difference between the middle data event 920 and the mathematically defined connecting function 930 are in terms of parameter values and time-based values. If the difference between the middle data event 920 and the mathematically defined connecting function 930 is within a predetermined threshold difference, the middle data event 920 is eliminated, otherwise the middle data event 920 is retained (as described below in relation to FIG. 13).

Figure 10:
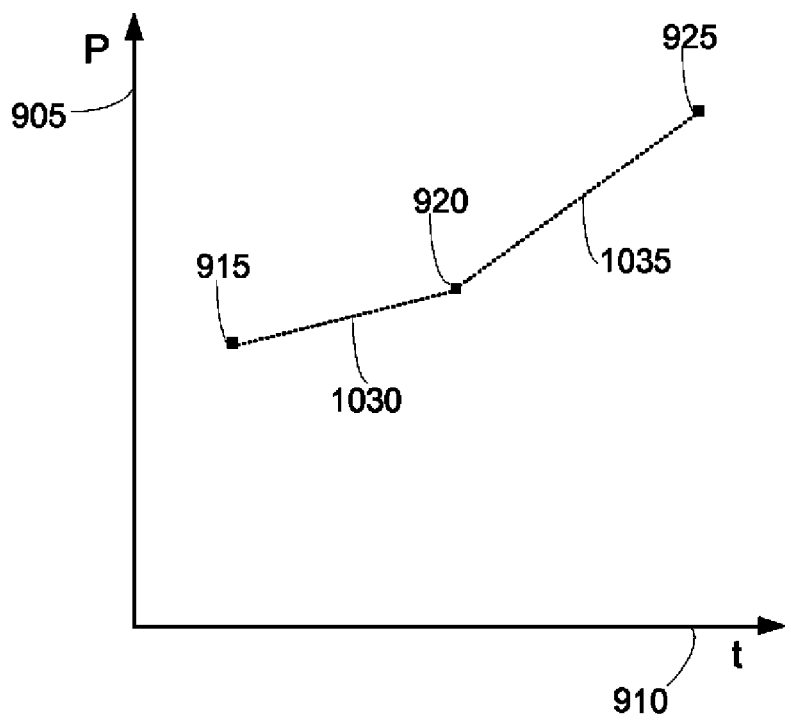
FIG. 10 shows a graphical illustration of an operation of a second algorithm used to reduce data events of a stream of data events.

FIG. 10 shows a graphical illustration of an operation of a second algorithm used to reduce data events of a stream of data events. The graphical illustration of FIG. 10 is similar to the graphical illustration of FIG. 9. Only those aspects that differ from FIG. 9 will be described in detail here.

As shown in FIG. 10, a first line 1030 having a first slope value connects the beginning data event 915 and the middle data event 920 and a second line 1035 having a second slope value connects the middle data event 920 and the ending data event 925. The first line 1030 and the second line 1035 as well as the first and second slope values are in terms of parameter values and time-based values. In accordance with the present invention, a difference between the first slope value and the second slope value is determined. If the difference between the slopes is within a predetermined threshold difference, the middle data event 920 is eliminated, otherwise the middle data event 920 is retained (as described below in relation to FIG. 14).

Figure 11:
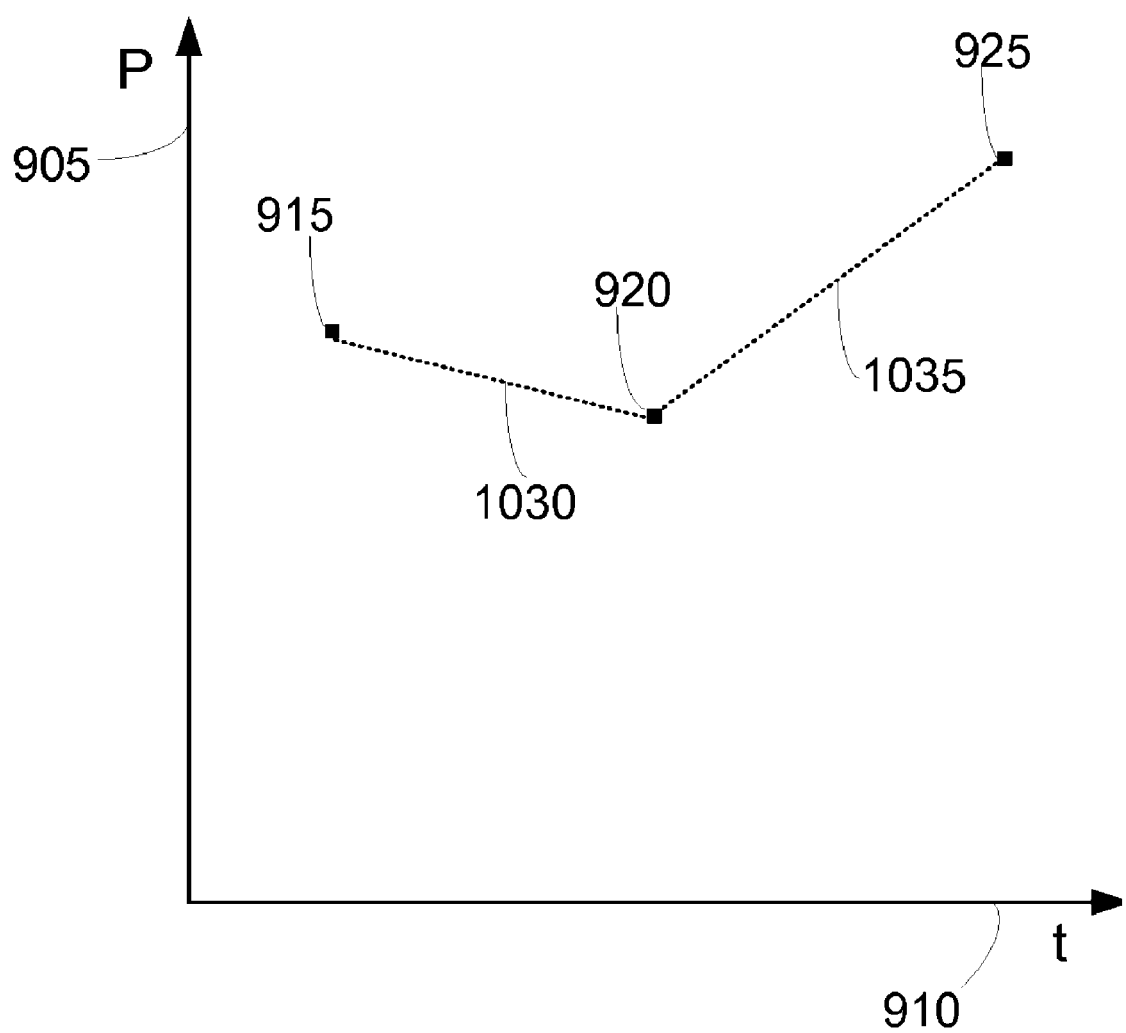
FIG. 11 shows a graphical illustration of an operation of a third algorithm used to reduce data events of a stream of data events.

FIG. 11 shows a graphical illustration of an operation of a third algorithm used to reduce data events of a stream of data events. The graphical illustration of FIG. 11 is similar to the graphical illustration of FIG. 10. Only those aspects that differ from FIG. 10 will be described in detail here.

As shown in FIG. 11, a first line 1030 having a first slope value connects the beginning data event 915 and the middle data event 920 and a second line 1035 having a second slope value connects the middle data event 920 and the ending data event 925. In accordance with the present invention, a sign of the first and second slope values are determined. If the first and second slope values are of the same sign, the middle data event 920 is eliminated, otherwise the middle data event 920 is retained (as described below in relation to FIG. 15).

Figure 12:
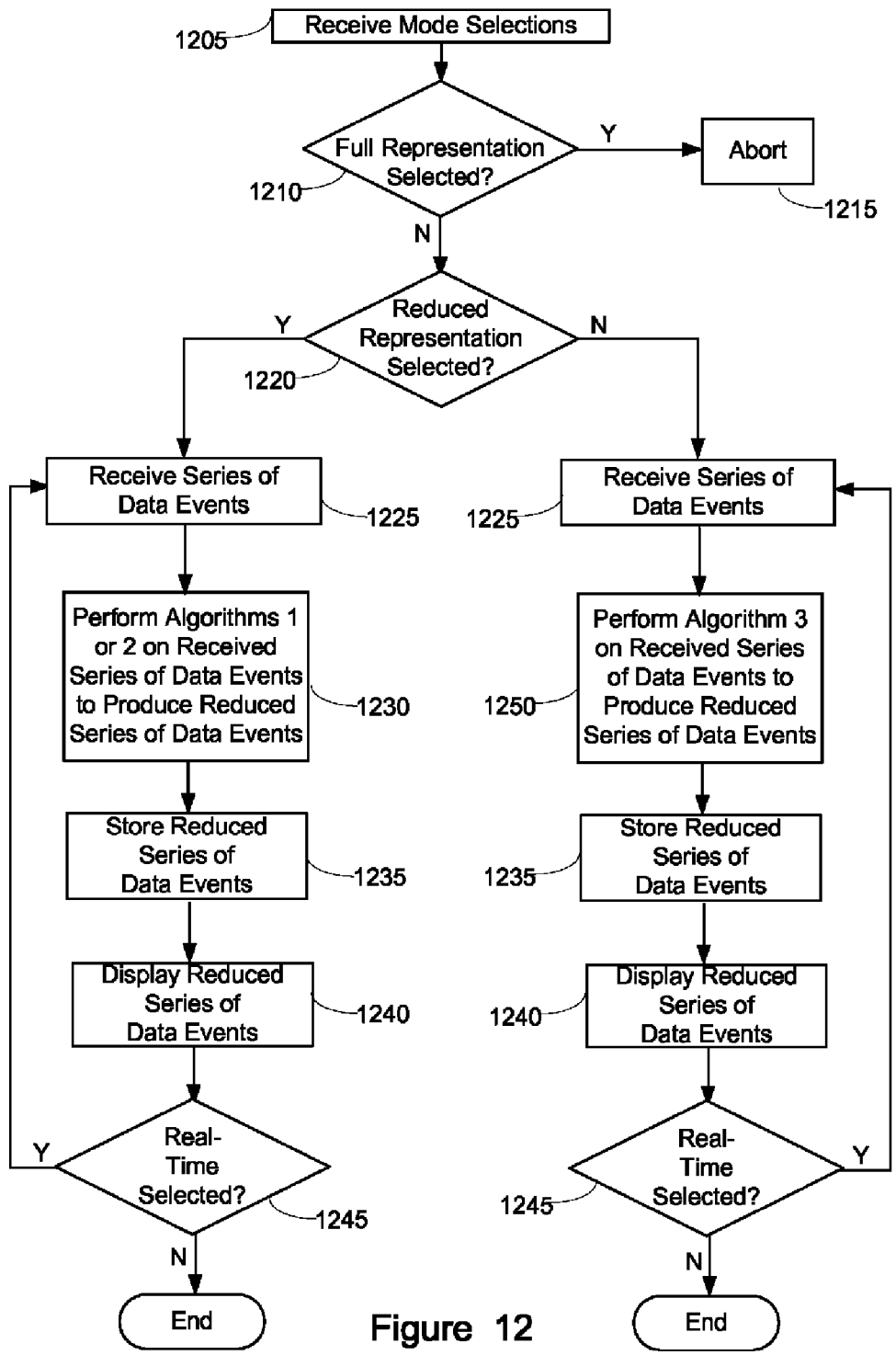
FIG. 12 illustrates a general process for reducing data events of a stream of data events.

FIG. 12 illustrates a general process for reducing data events of a stream of data events. This process may be executed, for example, by a multimedia application. The process starts when a user makes mode selections (for example through the mode selection interface 400 of FIG. 8) and mode selections are received (at 1205) by the process. The process determines (at 1210) if a full representation selection has been received. The processes for full representation of a stream of data events comprises capture of data events at a given sampling rate. These processes are typically undertaken by a conventional multimedia application and do not require further procedures. Therefore, if a full representation selection has been received (at 1210—Yes), the process aborts at 1215.

Otherwise, the process continues and determines (at 1220) if a reduced representation selection has been received. If so, the process receives (at 1225) a series of data events. The series of data events are received from a multimedia application for real-time processing and typically from storage in post-time processing (see below in relation to step 1245). The series of data events is comprised of 3 or more data events that are ordered according to time-based values contained in the data events. In real-time processing, the series of data events is comprised of a relatively small number of data events since real-time processing requires processing of data events immediately after generation. In post-time processing, the series of data events is comprised of a relatively large number of data events since post-time processing occurs after all data events have been captured and stored by a multimedia application (see below in relation to step 1245).

The process then performs (at 1230) a first algorithm or a second algorithm on the received series of data events. The first and/or second algorithms eliminate one or more data events from the received series of data events to produce a reduced series of data events. The process stores (at 1235) the reduced series of data events, for example, in a disk or random access memory. The process then displays (at 1240) a graphical representation of the reduced series of data events in (as shown, for example, in FIG. 6). As such, the process excludes from the graphical representation the data events that have been eliminated from the received series of data events.

The process then determines (at 1245) if a real-time selection has been received (at 1205). As stated above, real-time processing of data events allows for processing of data events immediately after generation of the data events by a multimedia application. Therefore, if the process determines (at 1245—Yes) that a real-time selection has been received, another series of data events will be received (at 1225) from the multimedia application for processing.

If the process determines (at 1245—No) that a real-time selection has not been received, then the process assumes that a post-time selection has been received (at 1205). The option for post-time processing of data events allows for processing of data events that have already been captured and stored. Therefore, the received series of data events comprise all the data events that need to be processed. Therefore, if the process determines (at 1245—No) that a post-time selection has been received, the process ends.

If the process determines (at 1220—No) that a reduced representation selection has not been received, the process assumes that a peaks-only representation selection has been received (at 1205). The process for a peaks-only representation selection is similar to the process for a reduced representation selection (described above) except that the process performs (at 1250) a third algorithm on the received series of data events.

Figure 13:
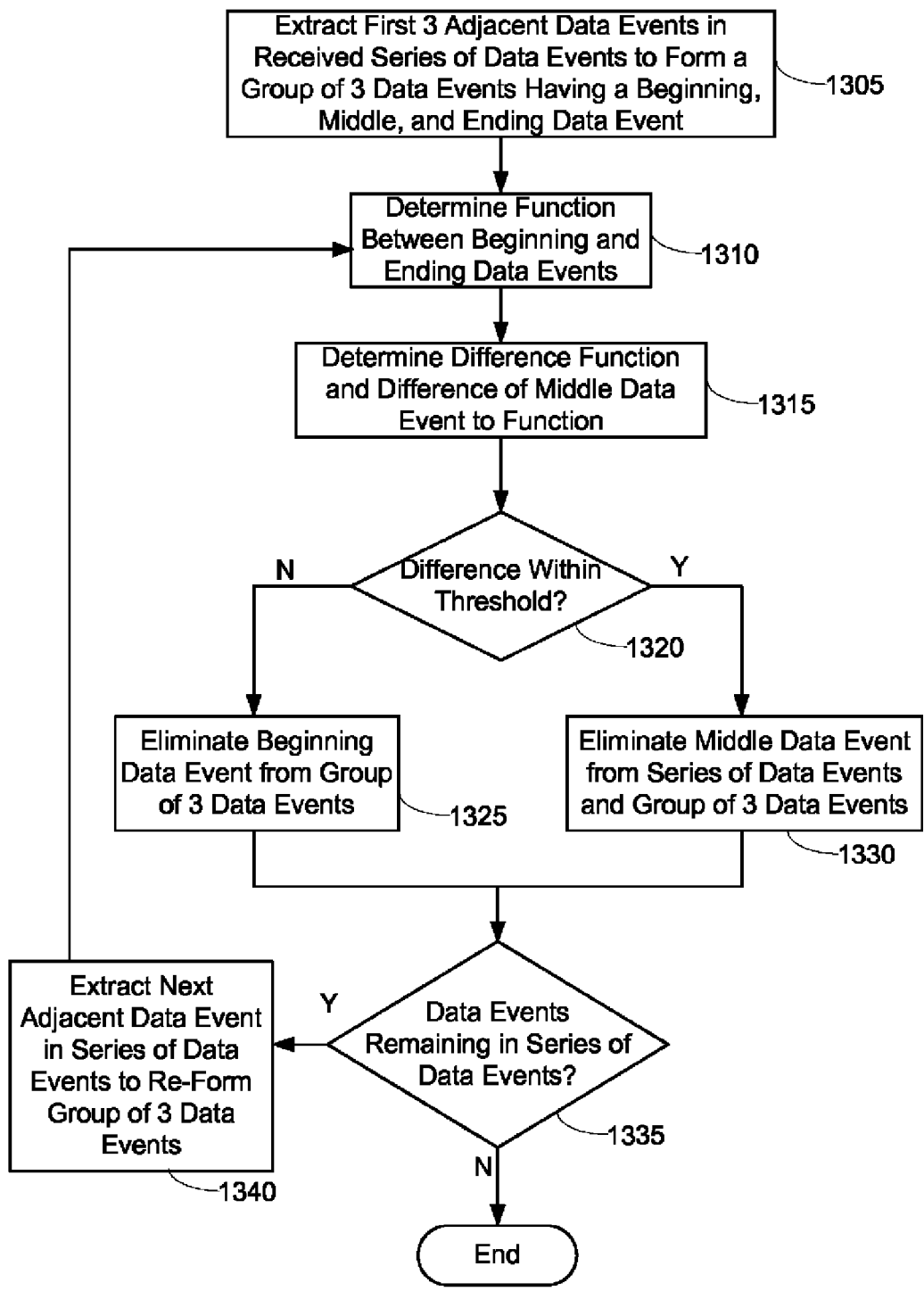
FIG. 13 illustrates a process for reducing data events of a stream of data events using a first algorithm.

FIG. 13 illustrates a process for reducing data events of a stream of data events using a first algorithm. The process starts when a series of data events is received and the process extracts (at 1305) the first 3 adjacent data events in the series of data events. The first 3 adjacent data events are the 3 data events with the lowest time-based values in the series of data events. In an alternative embodiment, any other set of 3 adjacent data events in the series of data events is extracted (at 1305). As used herein, adjacent data events refers to data events that have time-based values adjacent to each other relative to the time-based values of the other data events in the series of data events.

The 3 adjacent data events are used to form a group of 3 data events, the 3 data events being comprised of a beginning data event 915, a middle data event 920, and an ending data event 925. The beginning data event 915 has a time-based value lower than the time-based value of the middle data event 920 and the middle data event 920 has a time-based value lower than the time-based value of the ending data event 925.

The process then determines (at 1310) a mathematically defined connecting function 930 that connects the beginning data event 915 and the ending data event 925. As stated above, the mathematically defined connecting function 930 is determined by the type of parameter values contained in the data events 915, 920, and 925. The process then determines (at 1315) a difference function 935 that connects the middle data event 920 with the mathematically defined connecting function 930 and the length of the difference function 935, the length of the difference function 935 being equivalent to a difference or distance between the middle data event 920 and the mathematically defined connecting function 930. The difference function 935 and the difference between the middle data event 920 and the mathematically defined connecting function 930 are in terms of parameter values and time-based values.

The process determines (at 1320) if the difference between the middle data event 920 and the mathematically defined connecting function 930 is within a predetermined threshold difference. The predetermined threshold difference reflects the amount of variance that must be present between the middle data event 920 and the mathematically defined connecting function 930 for the middle data event 920 to be considered necessary to adequately represent the stream of data events and therefore retained. If the middle data event 920 is relatively close to the mathematically defined connecting function 930, the middle data event 920 may be considered unnecessary to adequately represent the stream of data events and therefore eliminated. The predetermined threshold difference may be altered depending on how accurate a representation of a stream of data events is desired.

If the process determines (at 1320—Yes) that the difference between the middle data event 920 and the mathematically defined connecting function 930 is within a predetermined threshold difference, the middle data event 920 is eliminated (at 1330) from the series of data events and the group of 3 data events. Therefore, the middle data event 920 may be eliminated from the series of data events based on the positions (in a graphical representation) of the three data events in the group of 3 data events relative to each other. As such, the middle data event 920 may be eliminated from the series of data events based in part on the parameter values and/or the time-based values of the three data events in the group of 3 data events relative to each other.

If the process determines (at 1320—No) that the difference between the middle data event 920 and the mathematically defined connecting function 930 is not within a predetermined threshold difference, the beginning data event 915 is eliminated (at 1325) from the group of 3 data events. Note that the middle data event 920 is not eliminated from the series of data events.

The process then determines (at 1335) if there are data events remaining in the series of data events to be processed. If so, the process extracts (at 1340) a next data event in the series of data events that is adjacent to the ending data event 925. In an alternative embodiment, the process extracts (at 1340) a next data event in the series of data events that is adjacent to the beginning data event 915.

The next data event and the remaining two data events in the group of 3 data events (either the beginning data event 915 or the middle data event 920 have been eliminated from the group of 3 data events) are used to re-form the group of 3 data events. As before, the data events are named according to the time-based values of the data events so that the beginning data event 915 has a time-based value lower than the time-based value of the middle data event 920 and the middle data event 920 has a time-based value lower than the time-based value of the ending data event 925. The process then continues at 1310.

If the process determines (at 1335—No) that there are no data events remaining in the series of data events, the process ends.

Figure 14:
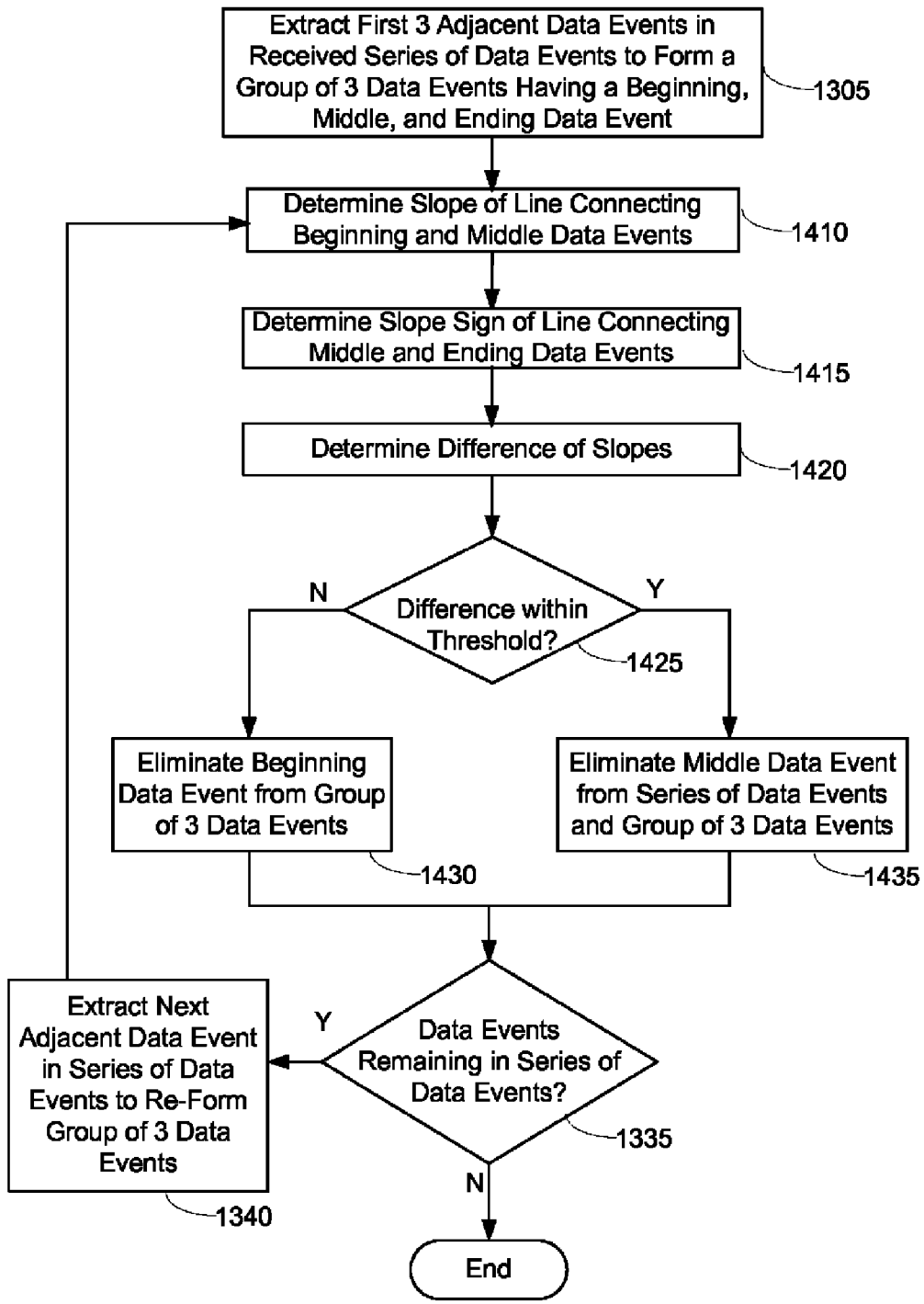
FIG. 14 illustrates a process for reducing data events of a stream of data events using a second algorithm.

FIG. 14 illustrates a process for reducing data events of a stream of data events using a second algorithm. FIG. 14 has aspects that are similar to those described above in relation to FIG. 13 that are not described here.

The process determines (at 1410) a first slope value of a first line 1030 that connects the beginning data event 915 and the middle data event 920 and determines (at 1415) a second slope value of a second line 1035 that connects the middle data event 920 and the ending data event 925. The first line 1030 and the second line 1035 as well as the first and second slope values are in terms of parameter values and time-based values. The process then determines (at 1420) a difference between the first and second slope values.

The process determines (at 1425) if the difference between the first and second slope values is within a predetermined threshold difference. The predetermined threshold difference reflects the amount of variance that must be present between the first and second slope values for the middle data event 920 to be considered necessary to adequately represent a stream of data events. If the first and second slope values are relatively close in value, the middle data event 920 may be considered unnecessary to adequately represent a stream of data events and therefore eliminated. The predetermined threshold difference may be altered depending on how accurate a representation of a stream of data events is desired.

If the process determines (at 1425—Yes) that the difference between the first and second slope values is within the predetermined threshold difference, the middle data event 920 is eliminated (at 1435) from the series of data events and the group of 3 data events. Therefore, the middle data event 920 may be eliminated from the series of data events based on the positions (in a graphical representation) of the three data events in the group of 3 data events relative to each other. As such, the middle data event 920 may be eliminated from the series of data events based in part on the parameter values and/or the time-based values of the three data events in the group of 3 data events relative to each other.

If the process determines (at 1425—No) that the difference between the first and second slope values is not within the predetermined threshold difference, the beginning data event 915 is eliminated (at 1430) from the group of 3 data events. Note that the middle data event 920 is not eliminated from the series of data events.

Figure 15:
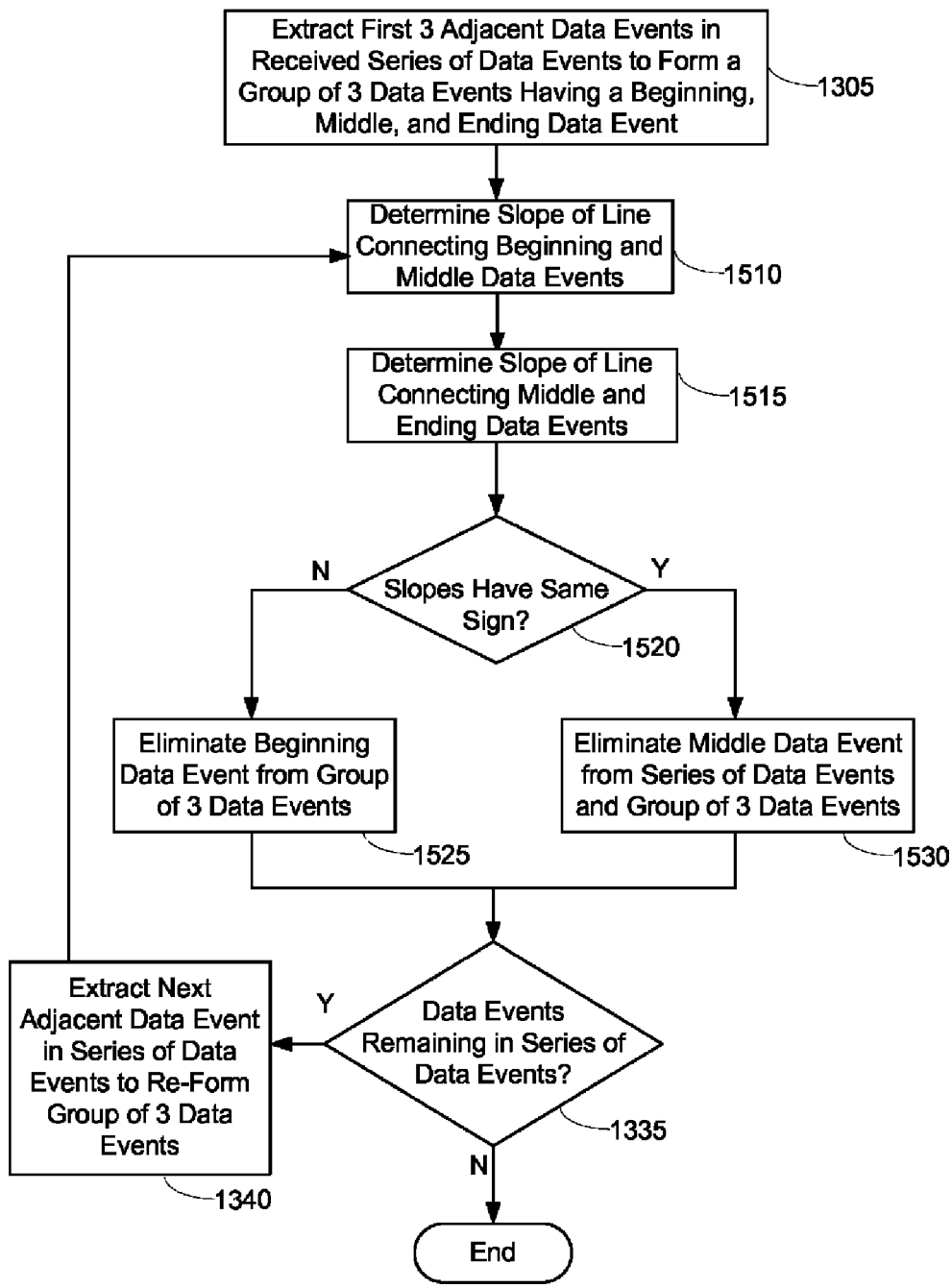
FIG. 15 illustrates a process for reducing data events of a stream of data events using a third algorithm.

FIG. 15 illustrates a process for reducing data events of a stream of data events using a third algorithm. FIG. 15 has aspects that are similar to those described above in relation to FIG. 13 that are not described here.

The process determines (at 1910) a first slope value of a first line 1030 that connects the beginning data event 915 and the middle data event 920 and determines (at 1915) a second slope value of a second line 1035 that connects the middle data event 920 and the ending data event 925. The process then determines (at 1920) if the first slope value has a same sign as the second slope value.

If the process determines (at 1920—Yes) that the first slope value has a same sign as the second slope value, the middle data event 920 is eliminated (at 1930) from the series of data events and the group of 3 data events. Therefore, the middle data event 920 may be eliminated from the series of data events based on the positions (in a graphical representation) of the three data events in the group of 3 data events relative to each other. As such, the middle data event 920 may be eliminated from the series of data events based in part on the parameter values and/or the time-based values of the three data events in the group of 3 data events relative to each other.

If the process determines (at 1920—No) that the first slope value does not have a same sign as the second slope value, the beginning data event 915 is eliminated (at 1925) from the group of 3 data events. Note that the middle data event 920 is not eliminated from the series of data events. By retaining the middle data event 920 only when the first slope value has a different sign as the second slope value, only data events that represent the "peaks" (i.e., local maxima) and "valleys" (i.e., local minima) of the stream of data events are retained.

Figure 16:
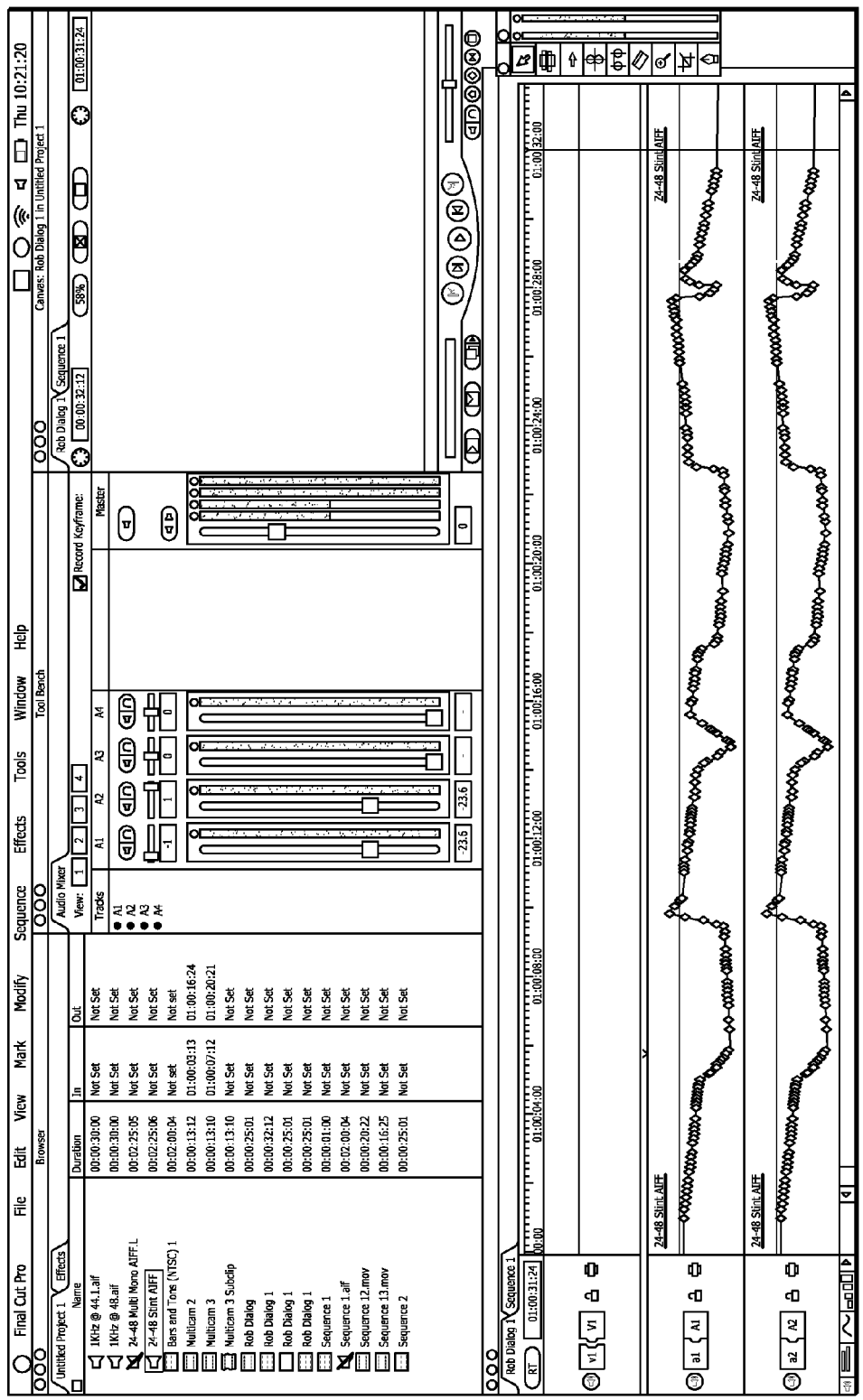
FIG. 16 shows a screen shot of an example of a full representation of a stream of data events.
Figure 17:
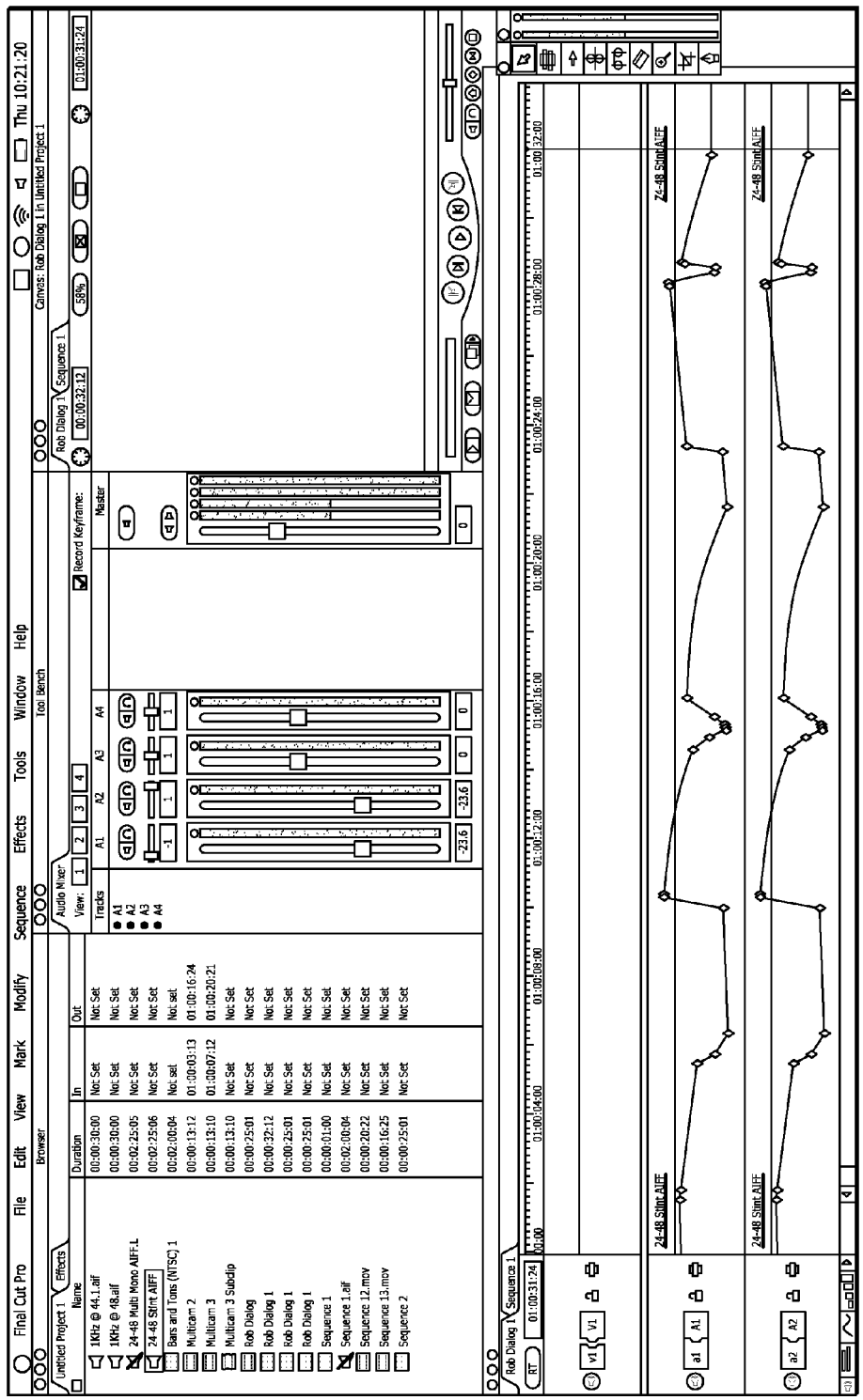
FIG. 17 shows a screen shot of an example of a reduced representation of a stream of data events in accordance with the present invention.
Figure 18:
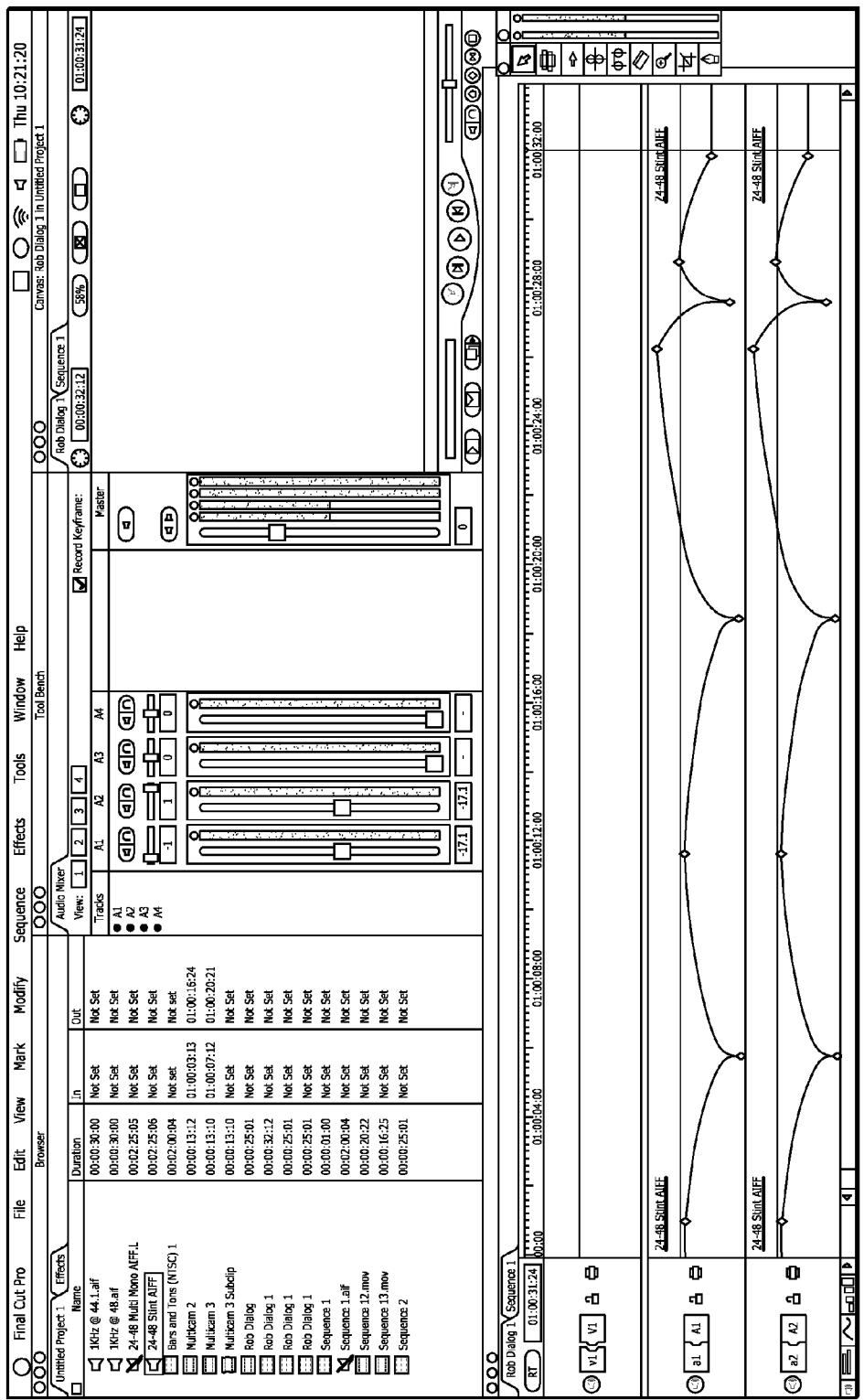
FIG. 18 shows a screen shot of an example of a peaks-only representation of a stream of data events in accordance with the present invention.
Figure 19:
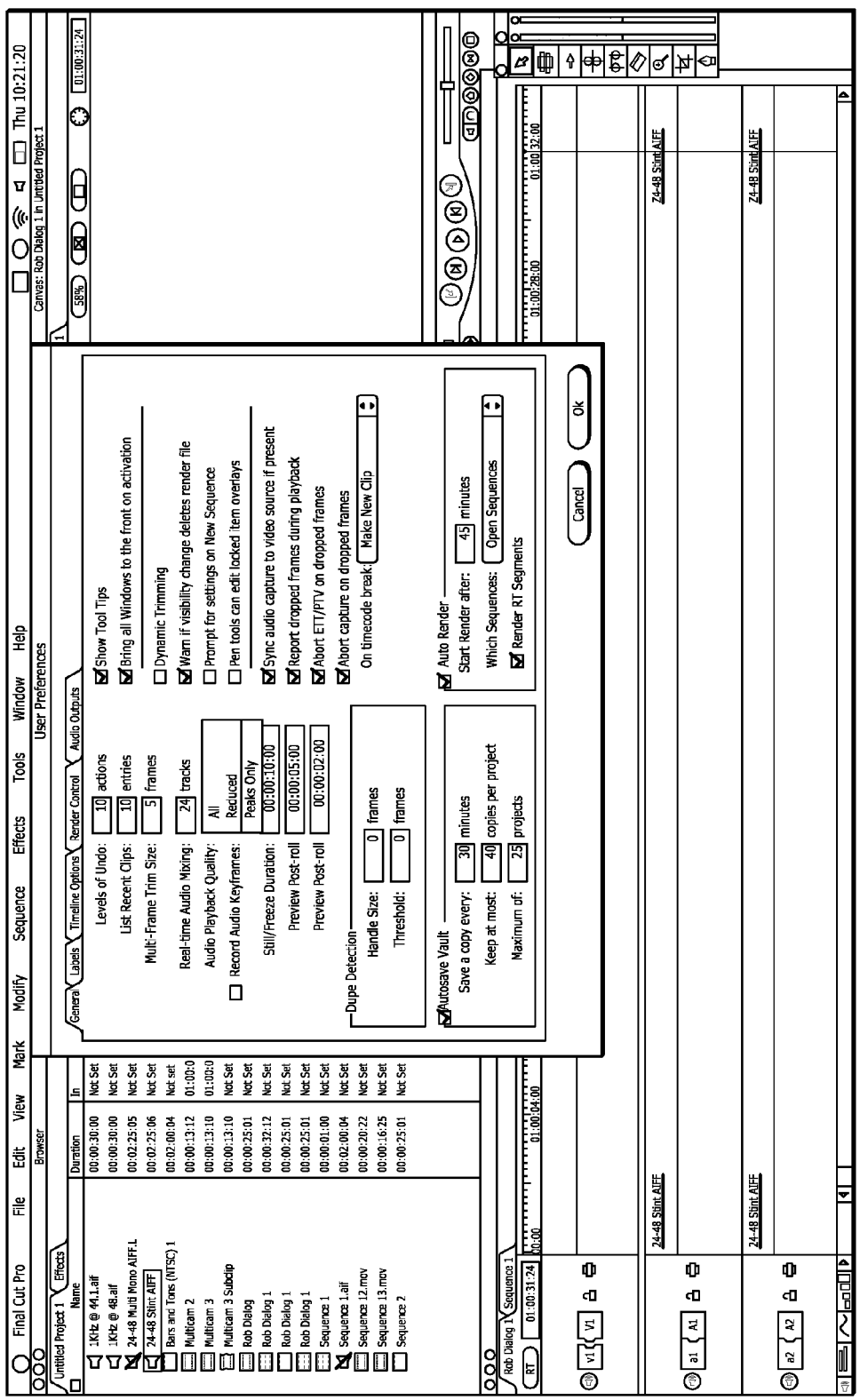
FIG. 19 shows a screen shot of an example a mode selection interface.

FIGS. 16 through 19 show examples of actual screen shots that are produced in relation to the present invention. FIG. 16 shows a screen shot of an example of a full representation of a stream of data events (described above in relation to FIG. 5). FIG. 17 shows a screen shot of an example of a reduced representation of a stream of data events (described above in relation to FIG. 6). FIG. 18 shows a screen shot of an example of a peaks-only representation of a stream of data events (described above in relation to FIG. 7). FIG. 19 shows a screen shot of an example a mode selection interface (described above in relation to FIG. 8).

As stated above, some embodiments of the invention provide a method for reducing data events representing a parameter of a signal adjusted by a user through a control interface during a time period. The embodiments described above often relate to a gain level parameter of an audio signal. One of ordinary skill in the art, however, will realize that the invention can relate to any variety of parameters relating to different types of signals. For example, the invention may relate to a panning level parameter of an audio signal. As another example, the invention may relate to a contrast or brightness level parameter of a video signal. In effect, the invention may relate to any time-based parameter of a signal.

Figure 20:
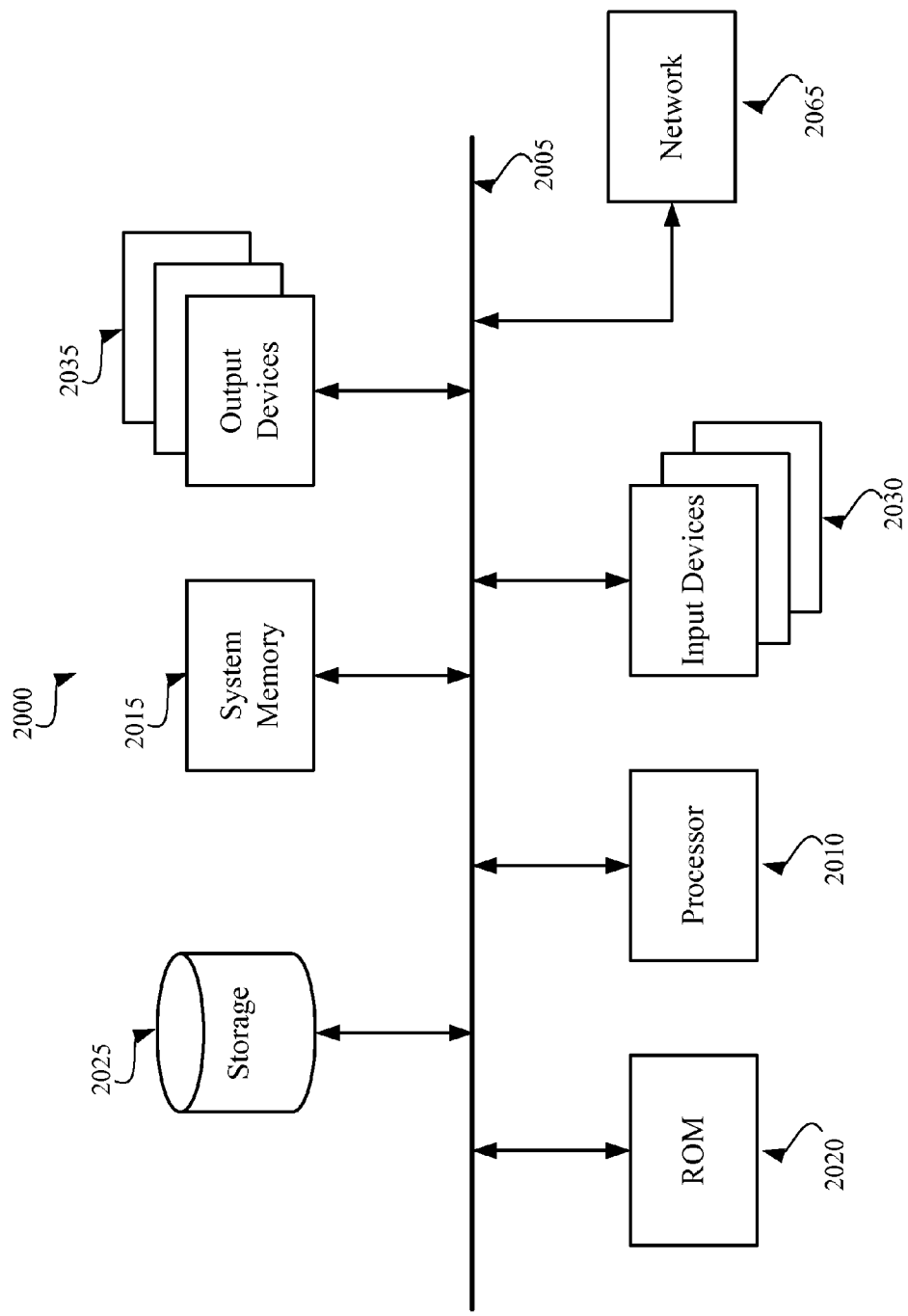
FIG. 20 presents a computer system with which some embodiments of the invention is implemented.

FIG. 20 presents a computer system with which some embodiments of the invention is implemented. Computer system 2000 includes a bus 2005, a processor 2010, a system memory 2015, a read-only memory 2020, a permanent storage device 2025, input devices 2030, and output devices 2035.

The bus 2005 collectively represents all system, peripheral, and chipset buses that communicatively connect the numerous internal devices of the computer system 2000. For instance, the bus 2005 communicatively connects the processor 2010 with the read-only memory 2020, the system memory 2015, and the permanent storage device 2025.

From these various memory units, the processor 2010 retrieves instructions to execute and data to process in order to execute the processes of the invention. The read-only-memory (ROM) 2020 stores static data and instructions that are needed by the processor 2010 and other modules of the computer system.

The permanent storage device 2025, on the other hand, is read-and-write memory device. This device is a non-volatile memory unit that stores instruction and data even when the computer system 2000 is off. Some embodiments of the invention use a mass-storage device (such as a magnetic or optical disk and its corresponding disk drive) as the permanent storage device 2025.

Other embodiments use a removable storage device (such as a floppy disk or Zip® disk, and its corresponding disk drive) as the permanent storage device. Like the permanent storage device 2025, the system memory 2015 is a read-and-write memory device. However, unlike storage device 2025, the system memory is a volatile read-and-write memory, such as a random access memory. The system memory stores some of the instructions and data that the processor needs at runtime. In some embodiments, the invention's processes are stored in the system memory 2015, the permanent storage device 2025, and/or the read-only memory 2020.

The bus 2005 also connects to the input and output devices 2030 and 2035. The input devices enable the user to communicate information and select commands to the computer system. The input devices 2030 include alphanumeric keyboards and cursor-controllers. The output devices 2035 display images generated by the computer system. For instance, these devices display IC design layouts. The output devices include printers and display devices, such as cathode ray tubes (CRT) or liquid crystal displays (LCD).

Finally, as shown in FIG. 20, bus 2005 also couples computer 2000 to a network 2065 through a network adapter (not shown). In this manner, the computer can be a part of a network of computers (such as a local area network ("LAN"), a wide area network ("WAN"), or an Intranet) or a network of networks (such as the Internet). Any or all of the components of computer system 2000 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a display device comprising a plurality of pixels, a method for generating a scale comprising:
    defining a set of values for a parameter of a media content;
    mapping the set of values to a set of pixels of the display device so that a number of pixels between at least one pair of defined values with a particular difference is not equal to a number of pixels between any other pair of defined values with the same particular difference, the mapping comprising: for each of a plurality of different pixels in the set of pixels,
        (i) selecting a particular pixel within the plurality of different pixels,
        (ii) identifying a relative position of the particular pixel within the set of pixels, and
        (iii) associating a defined value with the particular pixel based on the identified relative position of the particular pixel as normalized by a scaling value that relates to a predetermined maximum value of the set of values; and
    displaying the scale on the display device.

2. The method of claim 1, wherein the mapping comprises mapping the set of values to the set of pixels using a non-linear equation.

3. The method of claim 2, wherein the non-linear equation comprises logarithmic equation.

4. The method of claim 1, wherein the set of pixels specifies a vertical column of pixels of the display device.

5. The method of claim 1, wherein the set of pixels specifies a horizontal row of pixels of the display device.

6. The method of claim 1, wherein the scaling value changes a density of a pixel resolution around a particular value within the set of values.

7. The method of claim 6, wherein the media content is an audio signal, the parameter is a gain level of the audio signal, and the set of values specify gain levels for the audio signal, wherein the particular value within the set of values specifies a gain level of 0 decibels.

8. The method of claim 1 further comprising specifying a user interface item for moving along a set of pixels of the scale, wherein a position of the user interface item along the scale identifies a specific pixel corresponding to a particular mapped value.

9. The method of claim 8 further comprising specifying a display area for displaying a graph comprising a plurality of data events using a different set of pixels, wherein each data event identifies a value selected through the user interface item at a particular instance in time.

10. The method of claim 1, wherein the set of values are relative to the set of pixels and the set of values does not change when the position of the scale changes to a different set of pixels.

11. A method for editing a parameter of a media content using a media application, the method comprising:
 defining a scale for the media application, said scale comprising a set of values and a user interface item for moving along the set of values to specify any value from the set of values, wherein a position of the user interface item along the set of values specifies a particular parameter value for the media content;
 mapping a range of parameter values for the parameter of the media content to the set of values, the mapping comprising: for a plurality of different values within the set of values,
  (i) selecting a particular value within the plurality of different values,
  (ii) identifying a relative position of the particular value within the set of values, and
  (iii) calculating a parameter value for the particular value based on the identified relative position of the particular value as normalized by a scaling value that relates to a predetermined maximum parameter value in the range of parameter values; and
 displaying the scale in a display area of the media application.

12. The method of claim 11, wherein mapping comprises mapping the range of parameter values for the parameter to the set of values using a non-linear equation.

13. The method of claim 12, wherein the non-linear equation comprises a logarithmic equation.

14. The method of claim 11, wherein the media content is an audio signal and the parameter values specify gain levels of the audio signal, the method further comprising modifying a gain level of the audio signal to the specified particular parameter value.

15. The method of claim 11, wherein the media content is an audio signal and the parameter values specify panning levels of the audio signal, the method further comprising modifying a panning level of the audio signal to the specified particular parameter value.

16. The method of claim 11, wherein the media content is a video signal and the parameter values specify contrast levels of the video signal, the method further comprising modifying a contrast level of the video signal to the specified particular parameter value.

17. The method of claim 11, wherein the media content is a video signal and the parameter values specify brightness levels of the video signal, the method further comprising modifying a brightness level of the video signal to the specified particular parameter value.

18. A computer readable medium storing a computer program which when executed by at least one processor generates a scale for display on a display device comprising a plurality of pixels, the computer program comprising sets of instructions for:
 defining a set of values for a parameter of a media content;
 mapping the set of values to a set of pixels of the display device so that a number of pixels between at least one pair of defined values with a particular difference is not equal to a number of pixels between any other two pair of defined values with the same particular difference, the mapping comprising: for each of a plurality of different pixels in the set of pixels,
  (i) selecting a particular pixel within the plurality of different pixels,
  (ii) identifying a relative position of the particular pixel within the set of pixels, and
  (iii) associating a defined value with the particular pixel based on the identified relative position of the particular pixels as normalized by a scaling value that relates to a predetermined maximum value of the set of values; and
 displaying the scale on the display device.

19. A computer readable medium storing a computer program which when executed by at least one processor displays a scale for specifying a value for a parameter of a media content, the computer program comprising sets of instructions for:
 defining the scale using a set of values and a user interface item for moving along the set of values to specify any value from the set of values, wherein a position of the user interface item along the set of values specifies a particular parameter value for the media content;
 mapping a range of parameter values for the parameter of the media content to the set of values, the mapping comprising: for a plurality of different values within the set of values,
  (i) selecting a particular value within the plurality of different values,
  (ii) identifying a relative position of the particular value within the set of values, and
  (iii) calculating a parameter value for the particular value based on the identified relative position of the particular value as normalized by a scaling value that relates to a predetermined maximum parameter value in the range of parameter values; and
 displaying the scale in a display area of the computer program.

20. A graphical user interface ("GUI") for setting a value for a parameter of a media content, said GUI when displayed on a display device comprises a plurality of pixels of the display device, the GUI comprising:
 a scale comprising a range of parameter values, wherein the range of parameter values is mapped to a set of pixels of the display device, the mapping comprising: for a plurality of different pixels in the set of pixels,
  (i) selecting a particular pixel within the plurality of different pixels,
  (ii) identifying a relative position of the particular pixel within the set of pixels, and
  (iii) calculating a parameter value for the particular pixel based on the identified relative position of the particular pixel as normalized by a scaling value that relates to a predetermined maximum parameter value in the range of parameter values; and
 a user interface item movable along the scale displayed on the GUI, wherein a position of the user interface item along the scale identifies a specific pixel corresponding to a specific parameter value.

21. The GUI of claim 20, wherein the media content comprises an audio signal or a video signal.

22. The GUI of claim 20 further comprising a display area for displaying parameter values for the media content as adjusted by a user through the user interface item over a time interval.

23. The GUI of claim 22, wherein the display area comprises a graph comprising a plurality of data events, each data event representing a parameter value of the media content at a specific instance in time in the time interval.

24. The GUI of claim 20, wherein said GUI interfaces with a media editing application to pass the specific parameter value to the media editing application, wherein the media editing application produces a signal with the specific parameter value.

25. The GUI of claim 20, wherein a number of pixels between at least one pair of parameter values with a particular difference is not equal to a number of pixels between any other pair of parameter values with the same particular difference.

* * * * *

UNITED STATES PATENT AND TRADEMARK OFFICE
CERTIFICATE OF CORRECTION

| | | |
|---|---|---|
| PATENT NO. | : 7,805,685 B2 | Page 1 of 1 |
| APPLICATION NO. | : 11/872346 | |
| DATED | : September 28, 2010 | |
| INVENTOR(S) | : Alan C. Cannistraro et al. | |

It is certified that error appears in the above-identified patent and that said Letters Patent is hereby corrected as shown below:

In column 8, line 33, after "14)" insert -- . --.

In column 17, line 62, in claim 18, delete "other two pair" and insert -- other pair --, therefor.

Signed and Sealed this
Twenty-ninth Day of November, 2011

David J. Kappos
*Director of the United States Patent and Trademark Office*